United States Patent
Yabuguchi

(10) Patent No.: US 10,243,488 B2
(45) Date of Patent: Mar. 26, 2019

(54) ELECTRIC WORKING MACHINE AND METHOD FOR CONTROLLING ELECTRIC WORKING MACHINE

(71) Applicant: MAKITA CORPORATION, Anjo-shi, Aichi (JP)

(72) Inventor: Michisada Yabuguchi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 15/815,960

(22) Filed: Nov. 17, 2017

(65) Prior Publication Data

US 2018/0152120 A1 May 31, 2018

(30) Foreign Application Priority Data

Nov. 29, 2016 (JP) ................................. 2016-231294

(51) Int. Cl.
*H02K 7/14* (2006.01)
*H02P 3/22* (2006.01)
*H02P 6/14* (2016.01)
*H02P 6/24* (2006.01)
*H02P 29/024* (2016.01)

(52) U.S. Cl.
CPC ............... *H02P 3/22* (2013.01); *H02K 7/145* (2013.01); *H02P 6/14* (2013.01); *H02P 6/24* (2013.01); *H02P 29/027* (2013.01)

(58) Field of Classification Search
CPC .................................. H02P 3/22; H02K 7/145
USPC ......................................................... 318/379
See application file for complete search history.

(56) References Cited

U.S. PATENT DOCUMENTS

| | | | |
|---|---|---|---|
| 2009/0045762 A1* | 2/2009 | Hayashi | H02P 7/28 318/379 |
| 2011/0068728 A1* | 3/2011 | Kuratani | H02M 1/32 318/490 |
| 2013/0082627 A1 | 4/2013 | Ichikawa et al. | |
| 2013/0207581 A1* | 8/2013 | Aoki | H02P 6/24 318/400.21 |

FOREIGN PATENT DOCUMENTS

JP          2013-081285 A          5/2013

* cited by examiner

*Primary Examiner* — Erick D Glass
(74) *Attorney, Agent, or Firm* — Oliff PLC

(57) ABSTRACT

An electric working machine in one aspect of the present disclosure includes a motor, a first switching element, a second switching element, a rectifier element, and a controller. The controller is configured to perform a stop control, in which completion of a first current path is maintained via the first switching element for a specified period and a second current path is interrupted via the second switching element, in response to satisfaction of a stop condition for stopping power supply from a power source to the motor during rotation of the motor.

16 Claims, 14 Drawing Sheets

<STOPPING-TIME SPECIFIC CONTROL: APPLIED (LOW-SIDE KEPT ON)>

– – – – AT NORMAL DRIVE CONTROL (HIGH & LOW: ON)
– · – · – AT SATISFACTION OF STOP CONDITION
Q1: ON→OFF
Q6: ON→KEPT ON

<STOPPING-TIME SPECIFIC CONTROL: APPLIED (LOW-SIDE KEPT ON)>

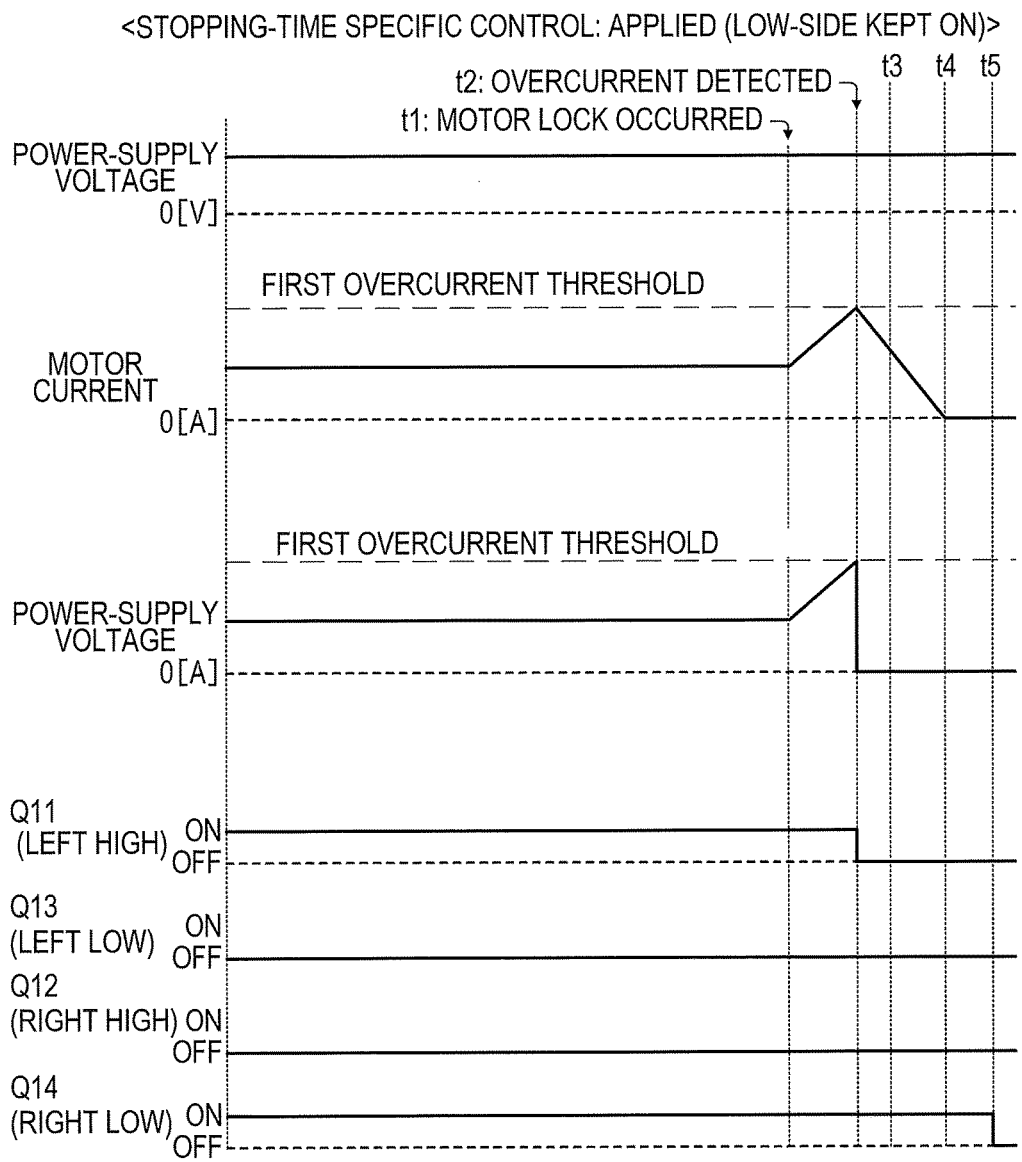

ELECTRIC WORKING MACHINE AND METHOD FOR CONTROLLING ELECTRIC WORKING MACHINE

CROSS-REFERENCE TO RELATED APPLICATIONS

This application claims the benefit of Japanese Patent Application No. 2016-231294 filed on Nov. 29, 2016 with the Japan Patent Office, the disclosure of which is incorporated herein by reference.

BACKGROUND

The present disclosure relates to an electric working machine including a motor.

Japanese Unexamined Patent Application Publication No. 2013-081285 discloses an electric power tool that includes an inverter as a drive circuit and in which a motor is stopped by turning OFF all switching elements forming the inverter when overcurrent is detected.

SUMMARY

In the above-described electric power tool, when all the switching elements in the drive circuit are turned OFF during energization of the motor, a regenerative current flowing from the motor to a power source may be generated mainly due to a magnetic energy accumulated in the motor, and such a regenerative current may cause increase in a power-supply voltage. When the power-supply voltage is increased due to the regenerative current, adverse effects may occur in various other circuits, elements, and so on that operate by being supplied with electric power from the power source.

In one aspect of the present disclosure, it is desirable to be able to inhibit generation of a regenerative current flowing from a motor of an electric working machine to a power source for the electric working machine.

An electric working machine in one aspect of the present disclosure includes a motor, a first switching element, a second switching element, a rectifier element, and a controller. The motor includes a first terminal, a second terminal, and a winding. The first terminal is electrically coupled to the second terminal via the winding. The first switching element is provided on a first current path between a first electrode of a power source and the first terminal. The first switching element is configured to selectively complete or interrupt the first current path. The second switching element is provided on a second current path between a second electrode of the power source and the second terminal. The second switching element is configured to selectively complete or interrupt the second current path. The rectifier element is coupled in parallel to the wiring and the first switching element coupled in series with each other. The rectifier element is configured to allow a loop current to circulate through the winding via the rectifier element and the first switching element in response to interruption of the second current path. The loop current flows due to a magnetic energy accumulated in the winding.

The controller is configured to control the motor via the first switching element and the second switching element. The controller is configured to perform a drive control, in which: the first current path is completed via the first switching element; the second current path is completed via the second switching element; and the motor is rotated. The controller is further configured to perform a stop control, in which completion of the first current path is maintained via the first switching element for a specified period and the second current path is interrupted via the second switching element, in response to satisfaction of a stop condition for stopping power supply from the power source to the motor during rotation of the motor.

In the above-described electric working machine, interrupted in response to satisfaction of the stop condition during the drive control is not both of the first current path and the second current path but just the second current path, and completion of the first current path is maintained.

In response to interruption of the second current path, current from the power source to the motor is blocked, whereas the loop current is diverted to the first current path via the rectifier element. As a result, the magnetic energy of the winding is consumed, and generation of a regenerative current flowing from the motor to the power source can be inhibited.

The specified period may be any period. The specified period may be, for example, equal to or longer than an estimated period from start of the stop control until a value of the loop current becomes zero.

In this case, generation of the regenerative current can be inhibited more effectively because all the magnetic energy can be consumed by the loop current in response to satisfaction of the stop condition.

The electric working machine may further include a third switching element provided on a third current path between the first electrode and the second terminal. In this case, the rectifier element may be coupled in parallel to the third switching element.

The motor may include a third terminal and an additional winding. The third terminal is electrically coupled to the first terminal via the additional winding. The electric working machine may further include an additional rectifier element that is coupled in parallel to the additional winding and the first switching element coupled in series with each other. The additional rectifier element is configured to allow part of the loop current to circulate through the additional winding via the additional rectifier element and the first switching element in response to interruption of the second current path. Such a configuration makes it possible to increase a rate of consumption of the loop current because the number of the paths through which the loop current flows is increased.

The controller may be configured, in the drive control, to maintain completion of the first current path via the first switching element, and to switch between completion and interruption of the second current path via the second switching element according to a duty ratio.

In this case, completion of the first current path may be continued in response to satisfaction of the stop condition. This can reduce a processing load, on the controller, caused by shifting from the drive control to the stop control.

The electric working machine may further include a drive state detector configured to detect a drive state of the motor. In this case, the controller may be further configured to determine whether the drive state of the motor is improper based on a detection result by the drive state detector. The stop condition may be satisfied in response to determination by the controller that the drive state of the motor is improper.

In the thus-configured electric working machine, in the event where the drive state of the motor is improper, the current from the power source to the motor can be blocked while inhibiting generation of the regenerative current flowing from the motor to the power source. An improper drive state of the motor may cause an excessively large current to flow through the motor. In such a case, if the first current path and the second current path are both interrupted, an excessively large regenerative current may flow from the motor to the power source. To cope with this, when the stop control is performed at occurrence of the improper drive state of the motor, the loop current flows through the first current path, whereby the magnetic energy is consumed. As a result, even if an excessively large current is flowing through the motor at occurrence of the improper drive state of the motor, generation of the regenerative current can be inhibited effectively.

The electric working machine may further include an operation portion configured to be operated to instruct rotation or stop of the motor. In this case, the stop condition may be satisfied in response to operation of the operation portion to stop rotation of the motor.

In the thus-configured electric working machine, in response to operation of the operation portion to stop rotation of the motor, rotation of the motor can be stopped while inhibiting generation of the regenerative current.

The electric working machine may further include a current detector configured to detect a value of a current flowing to the motor. In this case, the controller may be further configured to interrupt the first current path via the first switching element in response to satisfaction of an interruption condition. The interruption condition may be satisfied in response to detection, via the current detector, of the value larger than a threshold in the stop control.

When the stop control is started, the current from the power source to the motor is to be blocked. In spite of such a situation, if the value larger than the threshold is detected by the current detector even after start of the stop control, that is, if a current having the value larger than the threshold is flowing from the power source to the motor, any malfunction may be occurring in the electric working machine. Thus, when the current having the value larger than the threshold is detected by the current detector even after start of the stop control, the current flowing from the power source to the motor can be blocked by interrupting the first current path.

The first electrode may correspond to a positive electrode, and the second electrode may correspond to a negative electrode. Alternatively, the first electrode may correspond to a negative electrode, and the second electrode may correspond to a positive electrode.

The power source may be configured to generate a direct-current power.

Another aspect of the present disclosure is a method for controlling an electric working machine, the method including:

performing a drive control, in which a first current path and a second current path in the electric working machine are completed and a motor in the electric working machine is rotated, the first current path being provided between a first electrode of a power source and a first terminal of the motor, the second current path being provided between a second electrode of the power source and a second terminal of the motor; and performing a stop control, in which completion of the first current path is maintained for a specified period, the second current path is interrupted, and a loop current caused by a magnetic energy accumulated in a winding in the motor is circulated through the winding via a bypass path coupled in parallel to the winding and the first current path coupled in series to each other and via the first current path, in response to satisfaction of a stop condition for stopping power supply from the power source to the motor during rotation of the motor.

Such a method can produce effects similar to those of the above-described electric working machine.

BRIEF DESCRIPTION OF THE DRAWINGS

Example embodiments of the present disclosure will be described below with reference to the accompanying drawings, in which:

FIG. 14 is an explanatory diagram showing an operation example in a case of shifting to the stopping-time specific control during the normal drive control in the electric working machine of the fourth embodiment.

DETAILED DESCRIPTION OF THE PREFERRED EMBODIMENTS

[1. First Embodiment]
(1-1) Overall Configuration of Electric Working Machine

Figure 1:
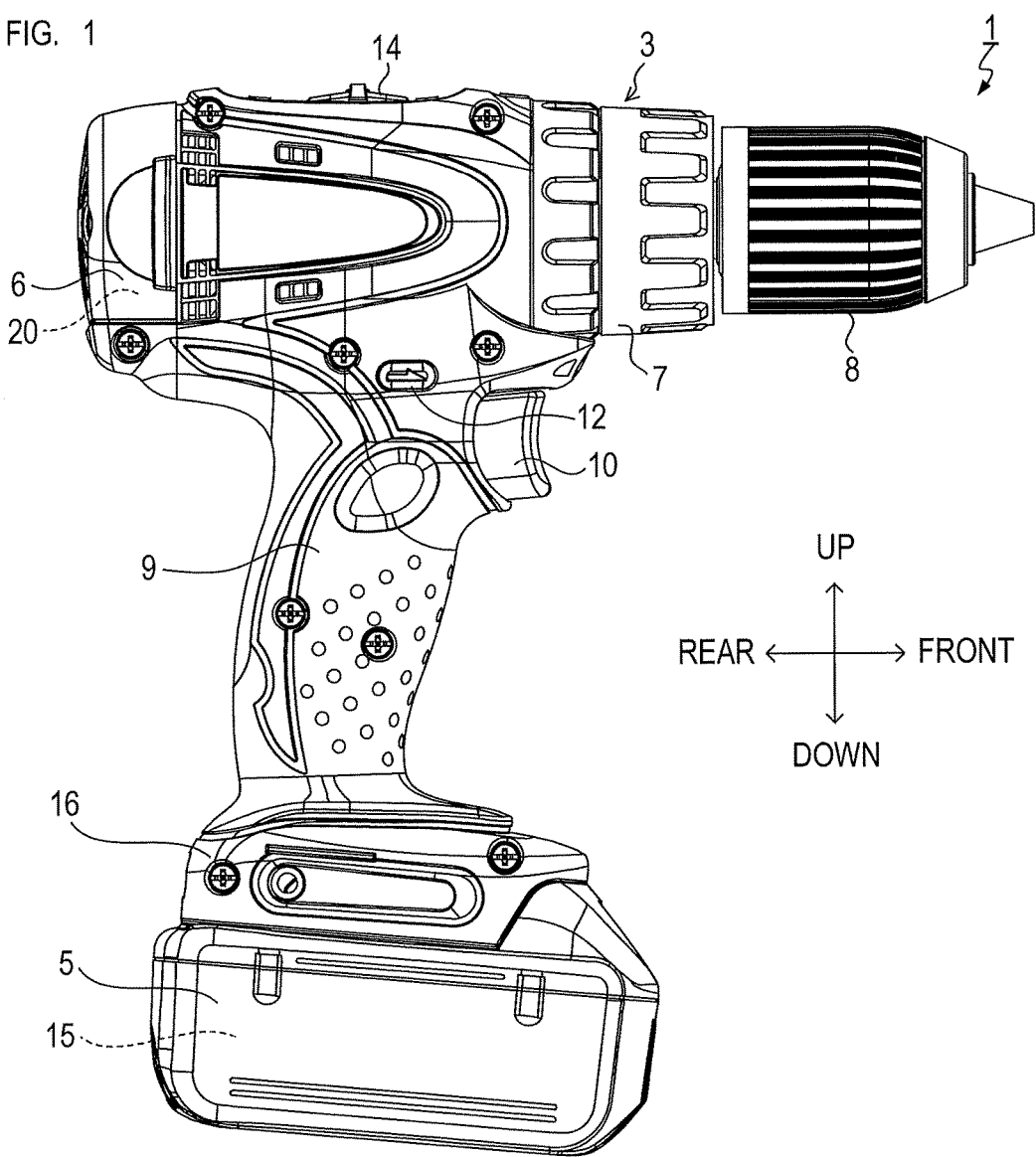
FIG. 1 is a side view of an entire electric working machine of the embodiments.

As shown in FIG. 1, an electric working machine 1 of the present example embodiment is a so-called driver drill used mainly for the purposes of hole-drilling and screw-tightening in a workpiece. The electric working machine 1 includes a main body 3 and a battery pack 5.

The battery pack 5 contains a battery 15. The battery pack 5 is attachable to and detachable from the main body 3. The battery pack 5 is configured such that, in a state of being attached to the main body 3, electric power can be supplied from the battery 15 to the main body 3.

The main body 3 includes a motor housing 6, a gear housing 7, a drill chuck 8, and a handgrip 9. The motor housing 6 contains a motor 20. The motor 20 generates driving force to rotationally drive the drill chuck 8.

The gear housing 7 is arranged forward of the motor housing 6. The gear housing 7 contains a gear mechanism (not shown). The gear mechanism transmits the driving force of the motor 20 to the drill chuck 8. The drill chuck 8 is arranged forward of the gear housing 7. Provided at a front end of the drill chuck 8 is an attachment mechanism that allows attachment and detachment of a tool bit.

The handgrip 9 is arranged downward of the motor housing 6. The handgrip 9 is shaped so as to allow a user of the electric working machine 1 to grip the handgrip 9 with one hand. Provided to an upper front part of the handgrip 9 is a trigger switch 10. The trigger switch 10 is operated by the user of the electric working machine 1 to drive or stop the motor 20.

When the trigger switch 10 is subjected to pulling operation, the motor 20 rotates, and when the trigger switch 10 is not subjected to the pulling operation, the motor 20 is in a stop state. Further, when the trigger switch 10 is subjected to the pulling operation, the rotational speed of the motor 20 varies according to an operation amount (hereinafter referred to as a pulling amount) in the pulling operation. Specifically, the greater the pulling amount is, the higher the rotational speed of the motor 20 becomes. The rotational speed of the motor 20 may be constant regardless of the pulling amount of the trigger switch 10.

The motor housing 6 has a forward-reverse switch 12 provided at a lower part thereof. The forward-reverse switch 12 is operated by the user to selectively change over the rotational direction of the motor 20 to either a forward direction or a reverse direction. As for the rotational direction of the motor 20, the forward direction and the reverse direction may be defined as appropriate.

Provided on an upper surface of the motor housing 6 is a mode changeover switch 14. The mode changeover switch 14 is operated by the user to selectively shift a speed mode of the motor 20 to any of a plurality of kinds of modes. In the present embodiment, the speed mode includes, for example, a low speed mode and a high speed mode. The speed mode is set to either of the low speed mode or the high speed mode by means of the mode changeover switch 14. When the trigger switch 10 is subjected to the pulling operation, the rotational speed of the motor 20 per the same pulling amount is higher in the high speed mode than in the low speed mode.

Provided to a lower end of the handgrip 9 is a battery pack attachment portion 16 for detachable attachment of the battery pack 5. The battery pack attachment portion 16 is configured to allow the battery pack 5 to be attached and detached by causing the battery pack 5 to slide in front-rear directions relative to the battery pack attachment portion 16.

(1-2) Electrical Configuration of Electric Working Machine

Figure 2:
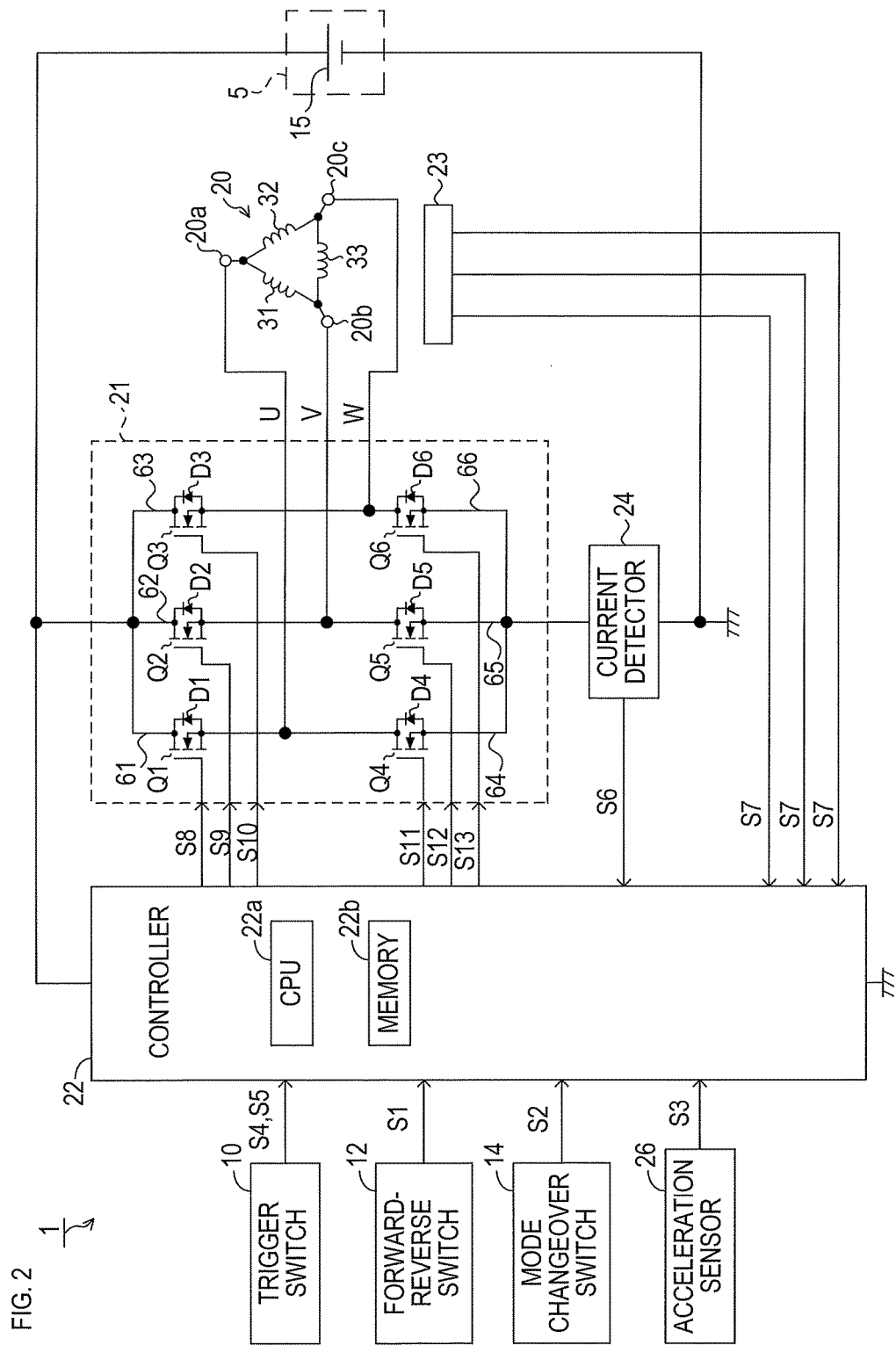
FIG. 2 is a configuration diagram showing an electrical configuration of the electric working machine of a first embodiment.

FIG. 2 shows a state in which the battery pack 5 is attached to the main body 3. As shown in FIG. 2, the electric working machine 1 includes the battery pack 5, the motor 20, a drive circuit 21, a controller 22, and a rotational position detector 23. In response to attachment of the battery pack 5 to the main body 3, electric power of the battery 15 (hereinafter referred to as battery power) is inputted to the drive circuit 21 and the controller 22. While the battery power is being inputted, the controller 22 operates on the battery power. The controller 22 receives the following signals:

S1 directional operation state signal from forward/reverse switch 12;

S2 modal operation state signal from mode changeover switch 14;

S3 acceleration signal from acceleration sensor 26;

S4 trigger switch ON/OFF signal from trigger switch 10;

S5 trigger switch pulled amount signal from trigger switch 10;

S6 power-supply current detection signal from current detector 24; and

S7 rotation position signals from rotational position detector 23.

The controller 22 sends drive control signals S8-S13 to the drive circuit 21. The rotation position signals S7 may be used to calculate rotational velocity (e.g., rpm) and/or rotational acceleration. Similarly, the power-supply current detection signal may be used to calculate a related power-supply current rate of change. The motor 20 is driven by the battery power supplied from the battery 15 via the drive circuit 21. The motor 20 of the present embodiment is a three-phase brushless motor. The battery power supplied from the battery 15 is converted into three-phase power by the drive circuit 21, and the three-phase power is supplied to the motor 20.

The motor 20 includes three windings 31, 32, and 33. In the present embodiment, these three windings 31, 32, and 33 are delta-connected. However, this is just one example, and any connection method other than the delta-connection may be employed. Additionally, the motor 20 includes three terminals 20a, 20b, and 20c as terminals for power input.

Specific shapes, structures, and so on of the terminals 20a, 20b, and 20c are not limited in particular, and the terminals 20a, 20b, and 20c can take any forms that allow the windings 31, 32, and 33 to be supplied with the battery power. For example, the terminals 20a, 20b, and 20c may be specifically-shaped conductor terminals each having a hole for insertion of an electric wire, or may be lead wires led out from a main body of the motor 20. Alternatively, the terminals 20a, 20b, and 20c may be specific portions, parts, or the like electrically coupled to the windings 31, 32, and 33 on a printed circuit board electrically coupled to the motor 20.

The rotational position detector 23 is configured to output signals corresponding to a rotational position of the motor 20, or specifically rotation position signals corresponding to a rotational position of a rotor of the motor 20. The rotational position detector 23 includes three Hall sensors. The respective Hall sensors are arranged around the rotor of the motor 20 at intervals of electrical angle 120 degrees. Signals outputted from the three Hall sensors are inputted to the controller 22. The controller 22 detects the rotational position and the rotational speed of the motor 20 on the basis of the signals inputted from the rotational position detector 23, that is, on the basis of the respective signals from the three Hall sensors. Rotational acceleration may also be calculated from these signals.

The drive circuit 21 is, in the present embodiment, a so-called three-phase full-bridge circuit including six switching elements Q1, Q2, Q3, Q4, Q5, and Q6.

The three switching elements Q1, Q2, and Q3, which are high-side switches, are provided on three positive-side current paths 61 to 63, respectively. The three positive-side current paths 61 to 63 are current paths respectively coupling the terminals 20a, 20b, and 20c of the motor 20 to a positive side of the battery 15. The three switching elements Q4, Q5, and Q6, which are low-side switches, are provided on three negative-side current paths 64 to 66, respectively. The three negative-side current paths 64 to 66 are current paths respectively coupling the terminals 20a, 20b, and 20c of the motor 20 to a negative side of the battery 15. The switching elements Q1 to Q6 complete the current paths 61 to 66, respectively, in response to being turned ON, and interrupt the current paths 61 to 66, respectively, in response to being turned OFF.

In other words, coupled to the terminal 20a are the switching element Q1 (hereinafter also referred to as a "U-phase high-side switch Q1") as the high-side switch and the switching element Q4 (hereinafter also referred to as a "U-phase low-side switch Q4") as the low-side switch. Similarly, coupled to the terminal 20b are the switching element Q2 (hereinafter also referred to as a "V-phase high-side switch Q2") as the high-side switch and the switching element Q5 (hereinafter also referred to as a "V-phase low-side switch Q5") as the low-side switch. Similarly, coupled to the terminal 20c are the switching element Q3 (hereinafter also referred to as a "W-phase high-side switch Q3") as the high-side switch and the switching element Q6 (hereinafter also referred to as a "W-phase low-side switch Q6") as the low-side switch.

In the present embodiment, the switching elements Q1 to Q6 are n-channel MOSFETs. Thus, diodes (so-called parasitic diodes) D1 to D6 are connected in parallel to the switching elements Q1 to Q6, respectively, between drains thereof and sources thereof such that a forward direction of each of the diodes D1 to D6 is directed from the source side to the drain side. The diodes D1 to D6 are connected so as to permit current flow from the negative side to the positive side of the battery 15, and so as to prohibit current flow from the positive side to the negative side of the battery 15.

The controller 22 has a one-chip microcomputer including a CPU 22a, a memory 22b, and so on. The memory 22b includes various semiconductor memories, such as a RAM, a ROM, and a non-volatile memory. The memory 22b stores therein various programs and data for performing various functions of the controller 22. The various functions of the controller 22 are performed by the CPU 22a's execution of the various programs stored in the memory 22b. The programs stored in the memory 22b include a program for an energization stop processing shown in FIG. 7, which will be described later.

The various functions of the controller 22 need not necessarily be performed by software processing. Some or all of the functions may be performed by using hardware configured with a combination of a logic circuit, an analog circuit, and so on. The controller 22 having the configuration with the one-chip microcomputer is just one example. The controller 22 may take various other configurations that allow the functions as the controller 22 to be performed.

Coupled to the controller 22 are the trigger switch 10, the forward-reverse switch 12, the mode changeover switch 14, and an acceleration sensor 26. A signal indicating an operation state of each of the trigger switch 10, the forward-reverse switch 12, and the mode changeover switch 14 is inputted from the corresponding switch to the controller 22.

The controller 22 determines, on the basis of the signal inputted from the trigger switch 10, whether the trigger switch 10 is being subjected to the pulling operation and, if so, determines the pulling amount. Then, the controller 22 performs a control corresponding to the result of such determination.

While the trigger switch 10 is OFF, that is, while the trigger switch 10 is not subjected to the pulling operation, the controller 22 does not output drive signals to any of the switching elements Q1 to Q6 in the drive circuit 21. In this way, the controller 22 brings all the switching elements Q1 to Q6 into an OFF state to thereby put the motor 20 in the stop state.

In contrast, while the trigger switch 10 is ON, that is, while the trigger switch 10 is being subjected to the pulling operation, the controller 22 performs a normal drive control to thereby rotate the motor 20. During performing the normal drive control, the controller 22 detects the rotational position of the motor 20 on the basis of the signals inputted from the rotational position detector 23, and performs an ON-OFF control of the switching elements Q1 to Q6 in the drive circuit 21 individually according to the detected rotational position. In this way, the controller 22 controls the current flowing from the battery 15 to the motor 20 to thereby rotate the motor 20.

In the normal drive control of the present embodiment, the controller 22 outputs drive signals to any one of the three high-side switches Q1 to Q3 and to any one of the three low-side switches Q4 to Q6 to turn ON such two switching elements, and thereby performs energization of the motor 20. Further, in the normal drive control, the controller 22 sequentially changes over one ON-target switching element at the high side and one ON-target switching element at the low side according to the rotational position of the motor 20, and thereby rotates the motor 20.

In the present embodiment, in the normal drive control, the controller 22 fixes one of the two ON-target switching elements in an ON state and drives the other according to a pulse-width modulation (PWM) control. The PWM control is a well-known control method in which alternation of ON and OFF is repeated periodically at a set duty ratio. In the normal drive control, the controller 22 may fix the two ON-target switching elements both in the ON state.

In the normal drive control, the controller 22 determines a directional operation state of the forward-reverse switch 12 on the basis of the signal inputted from the forward-reverse switch 12. Then, the controller 22 sets the rotational direction of the motor 20 to either the forward direction or the reverse direction according to the determined operation state, and controls the drive circuit 21 such that the motor 20 rotates in the set rotational direction.

In the normal drive control, the controller 22 determines a modal operation state of the mode changeover switch 14 on the basis of the signal inputted from the mode changeover switch 14. Then, the controller 22 sets an operation mode to either the low speed mode or the high speed mode according to the determined operation state, and controls the drive circuit 21 such that the motor 20 rotates at a rotational speed corresponding to the set operation mode.

The acceleration sensor 26 detects acceleration generated in the electric working machine 1, and outputs a signal indicating the detected acceleration to the controller 22. The acceleration sensor 26 of the present embodiment is, as an example, a three-axis acceleration sensor configured to be able to independently detect accelerations on mutually orthogonal three axes (X axis, Y axis, and Z axis).

When the user is working using the electric working machine 1, specific behaviors of the electric working machine 1 may occur due to various factors, such as a state of a work target, and a state how the electric working machine 1 is used by the user. Specifically, examples of such specific behaviors may include: fall-off, collision, or the like; being swung around in its entirety; and kickback. In the event of fall-off, collision, or the like, external impact is applied to the electric working machine 1. The electric working machine 1 is swung around by receiving reaction from the work target. The kickback is a phenomenon that the electric working machine 1 in operation is moved in a direction away from the work target by receiving reaction from the work target.

These specific behaviors exemplified above are all behaviors that may raise the possibility that a large acceleration may be generated in the electric working machine 1 in response to occurrence of such specific behaviors. Thus, while the motor 20 is being driven, the controller 22 detects the acceleration generated in the electric working machine 1 on the basis of the signal inputted from the acceleration sensor 26, and determines whether the specific behavior has occurred in the electric working machine 1 on the basis of the detected acceleration. If the controller 22 determines that the specific behavior has occurred, the controller 22 performs a stopping-time specific control, which will be described later, to thereby stop the current flowing from the battery 15 to the motor 20.

How to specifically determine whether the specific behavior has occurred on the basis of the detected acceleration may be decided as appropriate. For example, it may be one option to determine that the specific behavior has occurred when at least one of the accelerations of the three axes has exceeded a threshold.

Coupled to the drive circuit 21 is a current detector 24 that detects a value of the current (hereinafter referred to as power-supply current) supplied from the battery 15 to the motor 20. The current detector 24 includes, for example, a shunt resistor (not shown) provided on a path where the negative-side current paths 64 to 66 join together. A value of voltage across both ends of the shunt resistor becomes a value corresponding to the value of the power-supply current. The current detector 24 outputs a detection signal of the value of the voltage across the both ends of the shunt resistor to the controller 22 as a detection signal indicating the value of the power-supply current. The current detector 24 having the configuration with the shunt resistor is just one example. The current detector 24 may take other configurations that allow output of the detection signal corresponding to the value of the power-supply current.

The controller 22 detects the value of the power-supply current on the basis of the detection signal inputted from the current detector 24. Then, the controller 22 performs various controls according to the detected value.

(1-3) Stopping-time Specific Control

After starting the normal drive control in response to turning-ON of the trigger switch 10, if a stop condition for stopping power supply from the battery 15 to the motor 20 is satisfied, the controller 22 performs the stopping-time specific control. After performing the stopping-time specific control, the controller 22 keeps the motor 20 in a stop state in the end by turning OFF all the switching elements Q1 to Q6 in the drive circuit 21.

One example of a specific method for stopping rotation of the motor 20 during the normal drive control is to immediately turn OFF all the switching elements Q1 to Q6 in the drive circuit 21 when the stop condition is satisfied. However, in the state where the normal drive control is performed, that is, in the state where one switching element at the high side and one switching element at the low side are ON, if these two ON-state switching elements are both turned OFF, a regenerative current flows from the motor 20 toward the battery 15. Such a regenerative current may affect the controller 22.

Figure 3:
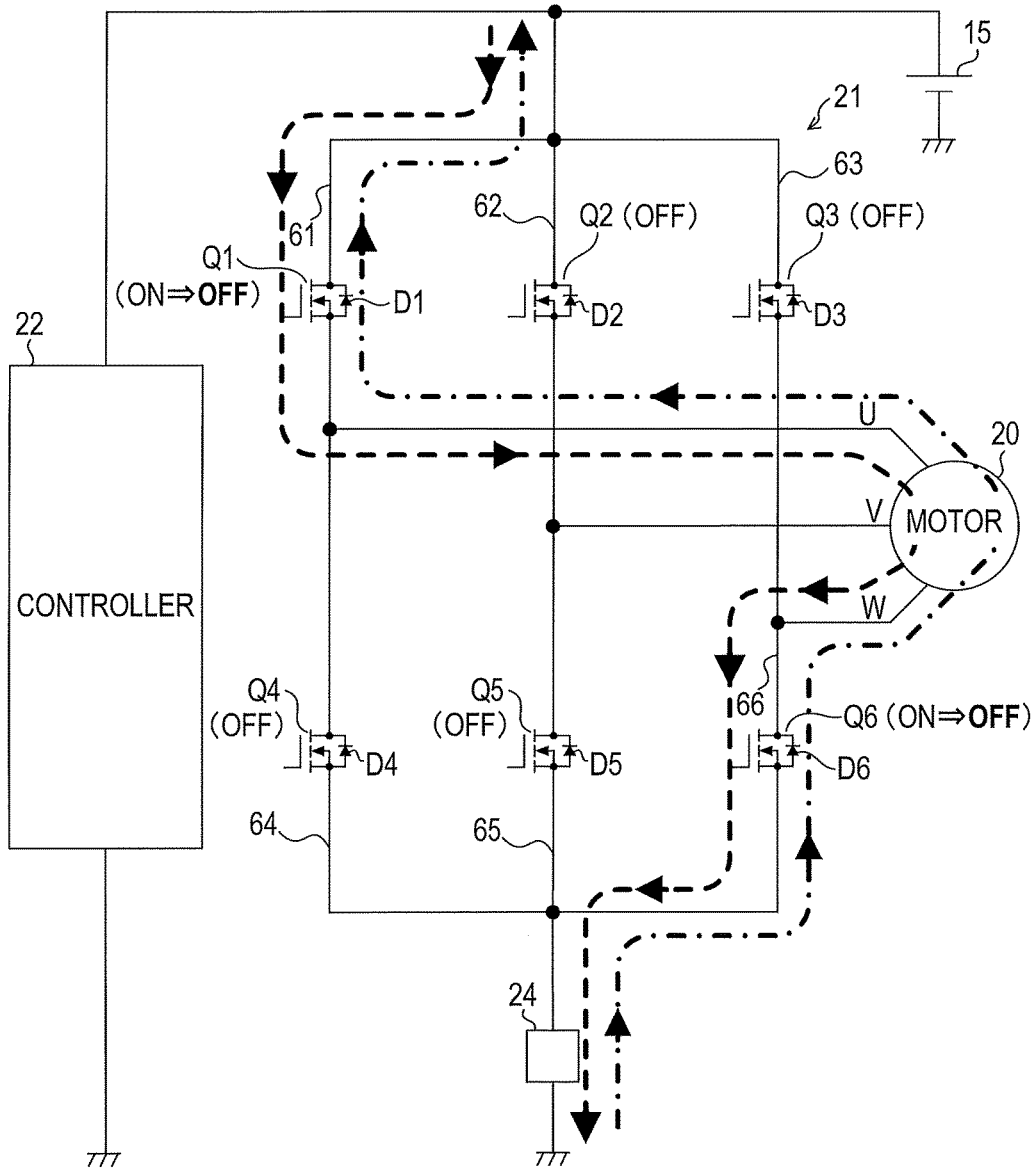
FIG. 3 is an explanatory diagram showing one example of respective current paths at the time of a normal drive control and at the time when all switching elements have been turned OFF during the normal drive control in the electric working machine of the first embodiment.

A more specific explanation will be given with reference to FIGS. 3 and 4. FIG. 3 is part of the overall electrical configuration of the electric working machine 1 shown in FIG. 2, and shows exclusively a circuit configuration leading from the battery 15 to the motor 20 via the drive circuit 21, and the controller 22. The same applies to FIGS. 5 and 8 to be described later.

For example, a case will now be described in which, in the normal drive control, the U-phase high-side switch Q1 and the W-phase low-side switch Q6 are ON as shown in FIG. 3. In this case, current flows through a path leading from the battery 15 toward the motor 20 as indicated by a broken line with arrows in FIG. 3. Specifically, the current flows through the path leading from a positive electrode of the battery 15, via the U-phase high-side switch Q1, the motor 20, the W-phase low-side switch Q6, and the current detector 24, to a negative electrode of the battery 15.

Figure 4:
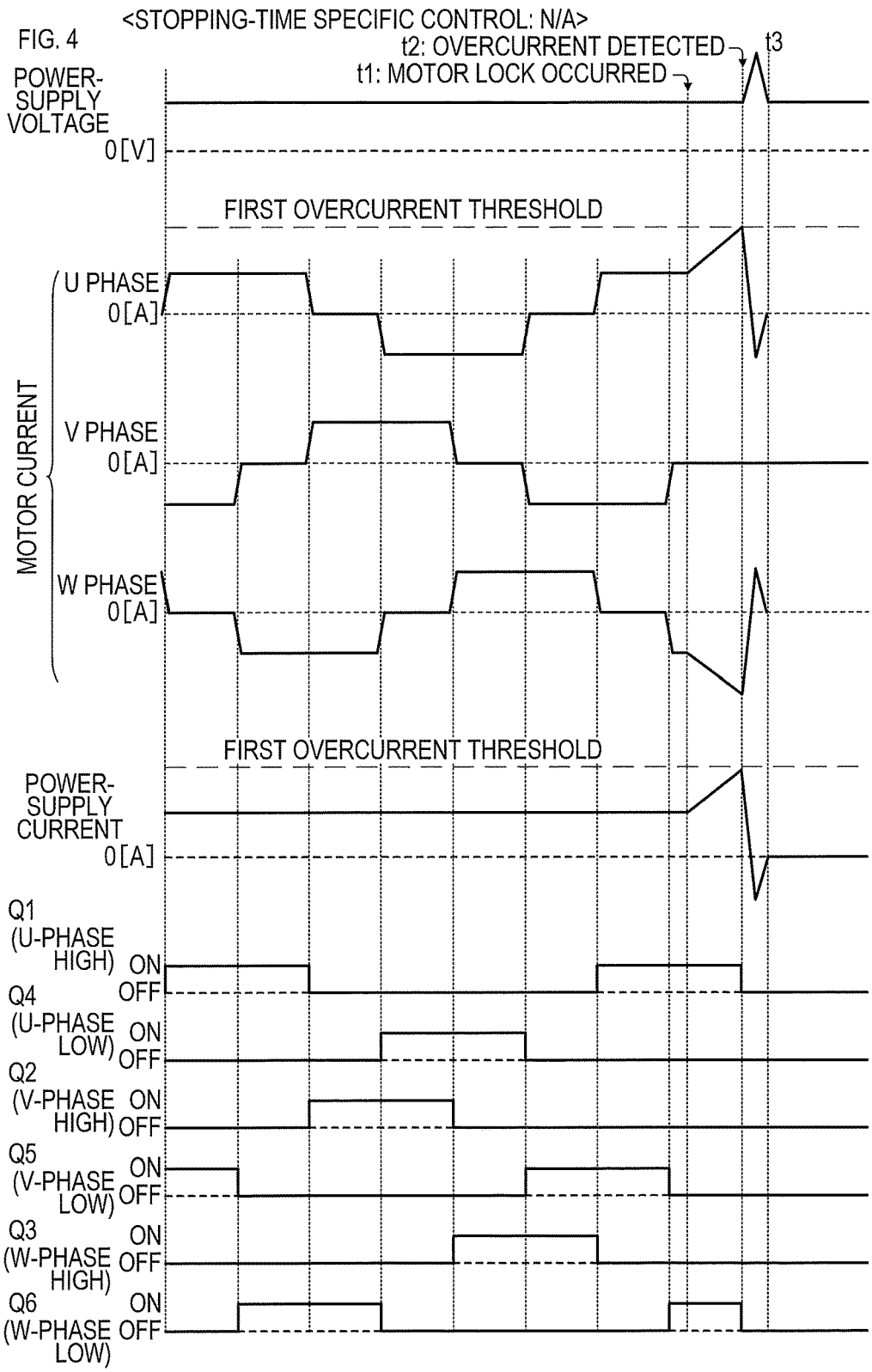
FIG. 4 is an explanatory diagram showing an operation example in a case of turning OFF all the switching elements during the normal drive control in the electric working machine of the first embodiment.

Among the six switching elements Q1 to Q6, the two ON-target switching elements are sequentially changed over according to the rotational position of the motor 20 as shown in FIG. 4. As described above, in the normal drive control, the controller 22 fixes one of the two ON-target switching elements in the ON state, and PWM-drives the other switching element. In FIG. 4 and in FIG. 6 to be described later, however, a PWM-driven state and an ON-fixed state are depicted in the same manner in showing the operations of the switching elements Q1 to Q6. On the other hand, in FIG. 9 to be described later, the ON-fixed state and the PWM-driven state are depicted in a distinguishable manner in showing the operations of the switching elements Q1 to Q6.

In FIG. 4, "power-supply voltage" is a voltage in the current path leading from the positive electrode of the battery 15 to the drive circuit 21 and to the controller 22, that is, a voltage in the current path to which the voltage of the battery 15 is applied. "Motor current" is a collective term for a U-phase current, a V-phase current, and a W-phase current, which are inputted from the drive circuit 21 to the terminals 20a, 20b, and 20c of the motor 20, respectively. In FIG. 4, a period before a time t2 is a period for performing the normal drive control, and the time t2 is a time point of shift from the normal drive control to the stopping-time specific control.

Stop conditions for shifting from the normal drive control to the stopping-time specific control may be decided as appropriate. In the present embodiment, set as the stop conditions are: that the trigger switch 10 is turned OFF; that the value of the power-supply current exceeds a first overcurrent threshold; and that the specific behavior occurs.

Among these stop conditions, whether the trigger switch 10 has been turned OFF is determined by the controller 22 on the basis of the signal inputted from the trigger switch 10 to the controller 22. Whether the value of the power-supply current has exceeded the first overcurrent threshold is determined by the controller 22 on the basis of the detection signal inputted from the current detector 24. Whether the specific behavior has occurred is determined by the controller 22 on the basis of the signal inputted from the acceleration sensor 26 as described above.

The controller 22 may be configured to determine whether the specific behavior has occurred not on the basis of the signal from the acceleration sensor 26 but on the basis of other physical quantity. For example, when the specific behavior occurs, the rotational speed of the motor 20 may change abruptly. Thus, a configuration may be adopted in which a threshold is set for the absolute value of a rate of change of the rotational speed and the controller 22 determines that the specific behavior has occurred when the absolute value of the rate of change of the rotational speed has exceeded the threshold. When the specific behavior occurs to cause such abrupt change of the rotational speed of the motor 20, the value of the power-supply current also may correspondingly change abruptly. Thus, a configuration may be adopted in which a threshold is set for the absolute value of a rate of change of the power-supply current and the controller 22 determines that the specific behavior has occurred when the absolute value of the rate of change of the power-supply current has exceeded the threshold.

As shown in FIG. 4, during the period before the time t2, in which the normal drive control is performed, the ON-target switching elements are sequentially changed over according to the rotational position of the motor 20. Every time the ON-target switching elements are changed over, the motor current also changes.

A case will now be described in which an improper drive state where the motor 20 is locked has occurred at a time t1. In other words, the case is such that the rotation of the motor 20 is decelerated or stopped forcibly by an external factor at the time t1. At the time t1, the U-phase high-side switch Q1 and the W-phase low-side switch Q6 are in the ON state as shown in FIG. 4, and the current flows through the path indicated by the broken line with arrows in FIG. 3.

When the locking of the motor 20 occurs to cause deceleration of the rotational speed of the motor 20 or to stop the motor 20 at the time t1, the value of the power-supply current becomes larger than that in a normal drive state. Specifically, the current values of the U-phase current and the W-phase current both become larger.

Then, when the value of the power-supply current has exceeded the first overcurrent threshold at the time t2, the two ON-state switching elements Q1 and Q6 are both turned OFF by the controller 22. As a result, the regenerative current flowing to the battery 15 is generated by magnetic energy accumulated in the windings 31 to 33 of the motor 20.

The regenerative current in this case is generated as shown by waveforms of the power-supply current and the motor current between the time t2 and a time t3 in FIG. 4, and flows through a path indicated by a dot-and-dash line with arrows in FIG. 3. As shown in FIG. 4, this regenerative current causes the power-supply voltage to rise temporarily. Such rise in the power-supply voltage means rise in the voltage in the positive-side current paths 61 to 63 coupled to the positive electrode of the battery 15. Thus, when the power-supply voltage (Vps) rises, a voltage higher than a battery voltage (Vbat) is to be applied to the respective portions including the controller 22, which are configured to be supplied with the battery voltage, resulting in the fear of failure and/or malfunction of these respective portions. To summarize, Vps>Vbat during t2<t<t3.

Thus, the controller 22 of the present embodiment performs the stopping-time specific control for a specified period in response to satisfaction of the stop condition during the normal drive control. The stopping-time specific control is a control in which only one of the two ON-state switching elements is turned OFF and the other switching element is kept in the ON state in response to satisfaction of the stop condition.

Figure 5:
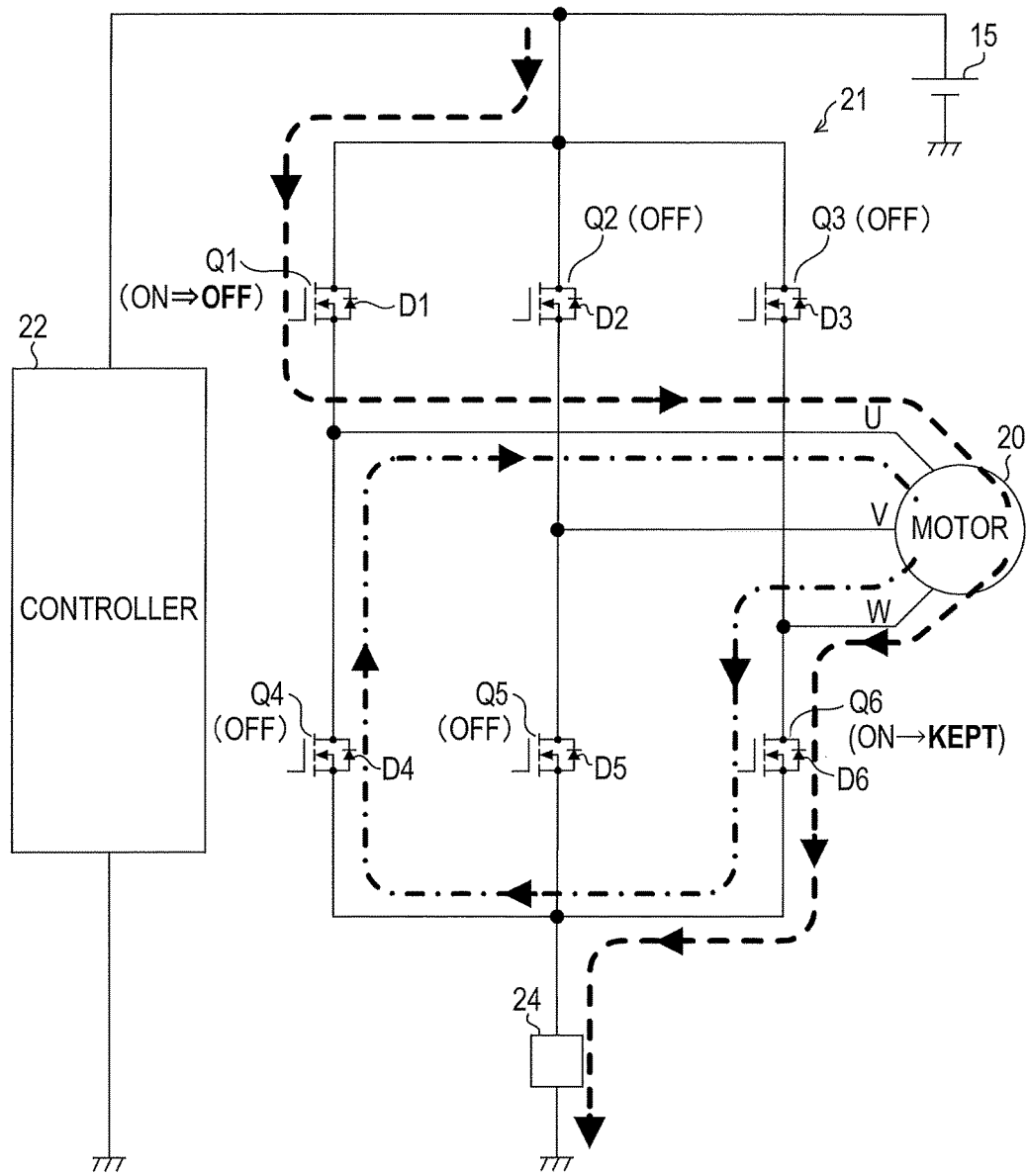
FIG. 5 is an explanatory diagram showing one example of respective current paths at the time of the normal drive control and at the time when the normal drive control has been shifted to a stopping-time specific control in the electric working machine of the first embodiment.

A specific explanation will be given of one example of the stopping-time specific control with reference to FIGS. 5 and 6. In the present embodiment, of the two ON-state switching elements, the controller 22 turns OFF the switching element at the high side, and keeps the switching element at the low side in the ON state as the stopping-time specific control. A current path during the normal drive control indicated by a broken line with arrows in FIG. 5 is the same as that in FIG. 3. An operation example before the time t2 in FIG. 6 is completely the same as that in FIG. 4.

Figure 6:
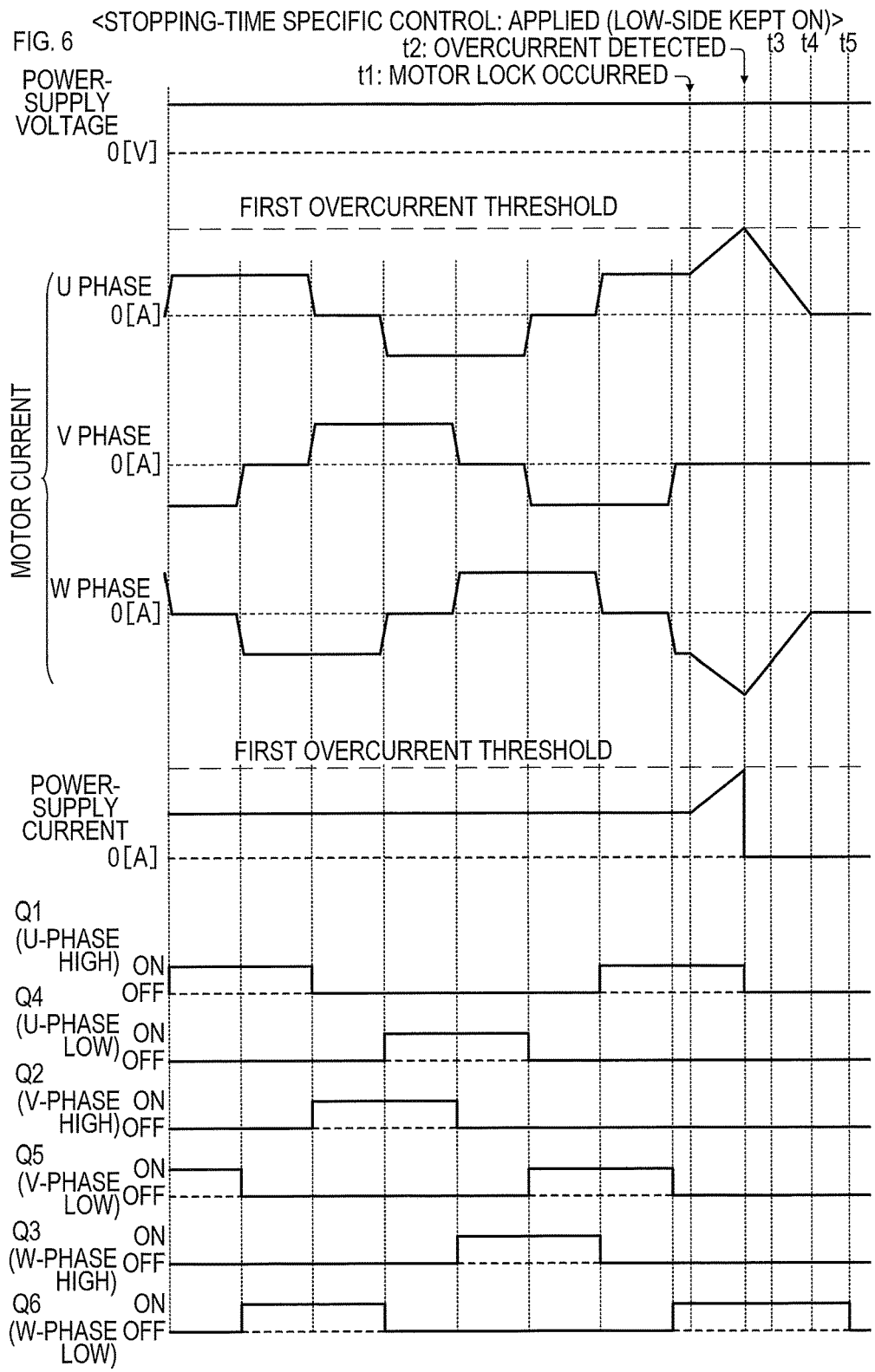
FIG. 6 is an explanatory diagram showing an operation example in a case of shifting to the stopping-time specific control during the normal drive control in the electric working machine of the first embodiment.

As shown in FIG. 6, in response to occurrence of the locking of the motor 20 at the time t1, the value of the power-supply current is increased to exceed the first overcurrent threshold at the time t2, and then the stopping-time specific control is performed. In the present embodiment, the specified period for performing the stopping-time specific control is a period from when the value of the power-supply current has exceeded the first overcurrent threshold to when a given specific performance time has elapsed. In FIG. 6, the time t2 is the beginning of the specified period, and a time t5 after elapse of the specific performance time from the time t2 is the termination of the above-described specified period.

In the example shown in FIG. 6, the U-phase high-side switch Q1 and the W-phase low-side switch Q6 are in the ON state at the time t2 at which the value of the power-supply current exceeds the first overcurrent threshold. That is, at the time t2, the current is flowing through the path indicated by the broken line with arrows in FIG. 5. When the stopping-time specific control is performed in this state, the U-phase high-side switch Q1 is turned OFF and the W-phase low-side switch Q6 is kept in the ON state as shown in FIG. 6.

This causes a loop current to flow between the motor 20 and the drive circuit 21 through a path indicated by a dot-and-dash line with arrows in FIG. 5. Specifically, the loop current flows through the path leading from the third terminal 20c of the motor 20, via the W-phase low-side switch Q6 and the diode D4 of the U-phase low-side switch Q4, to the first terminal 20a of the motor 20. The loop current is not a current to regenerate the magnetic energy of the motor 20 to the battery 15, but a current flowing through a closed path that couples the motor 20 and the drive circuit 21 to each other. The magnetic energy of the motor 20 is consumed by flowing of this loop current. The loop current also flows through a path leading from the third terminal 20c of the motor 20, via the W-phase low-side switch Q6 and the diode D5 of the V-phase low-side switch Q5, to the second terminal 20b of the motor 20.

Thus, in response to start of the stopping-time specific control at the time t2, the value of the power-supply current detected by the current detector 24 becomes zero as shown in FIG. 6, and the loop current is generated by the U-phase current and the W-phase current. This loop current is gradually reduced and becomes zero at a time t4. Then, the stopping-time specific control is terminated at the time t5. In the present embodiment, in response to termination of the stopping-time specific control, the controller 22 brings all the switching elements Q1 to Q6 in the drive circuit 21 into the OFF state.

The specified period for performing the stopping-time specific control is the specific performance time, which is from the time t2 to the time t5 in FIG. 6. In the present embodiment, the specific performance time is set to be equal to or longer than a time required (or estimated) until the loop current becomes zero. The period from when the stopping-time specific control is started at the time t2 to when the loop current becomes zero varies depending on the value of the power-supply current at start of the stopping-time specific control and various other factors. In addition, the current detector 24 cannot detect a value of the loop current because the loop current does not flow through the current detector 24.

Thus, in the present embodiment, a period required until the loop current becomes zero in the case where the stopping-time specific control is started while the current having the current value equal to the first overcurrent threshold is flowing is determined theoretically or experimentally on the basis of electrical properties of the entire path through which the loop current flows, the first overcurrent threshold, and so on. A value obtained by adding a specified margin to the determined period is set as the specific performance time.

(1-4) Energization Stop Processing

Next, an explanation will be given of the energization stop processing performed to achieve shift from the normal drive control to the stopping-time specific control with reference to FIG. 7. In response to turning-ON of the trigger switch 10, the controller 22 starts the normal drive control and performs the energization stop processing shown in FIG. 7 along with the normal drive control. The energization stop processing by the controller 22 is performed specifically by the CPU 22*a*.

Figure 7:
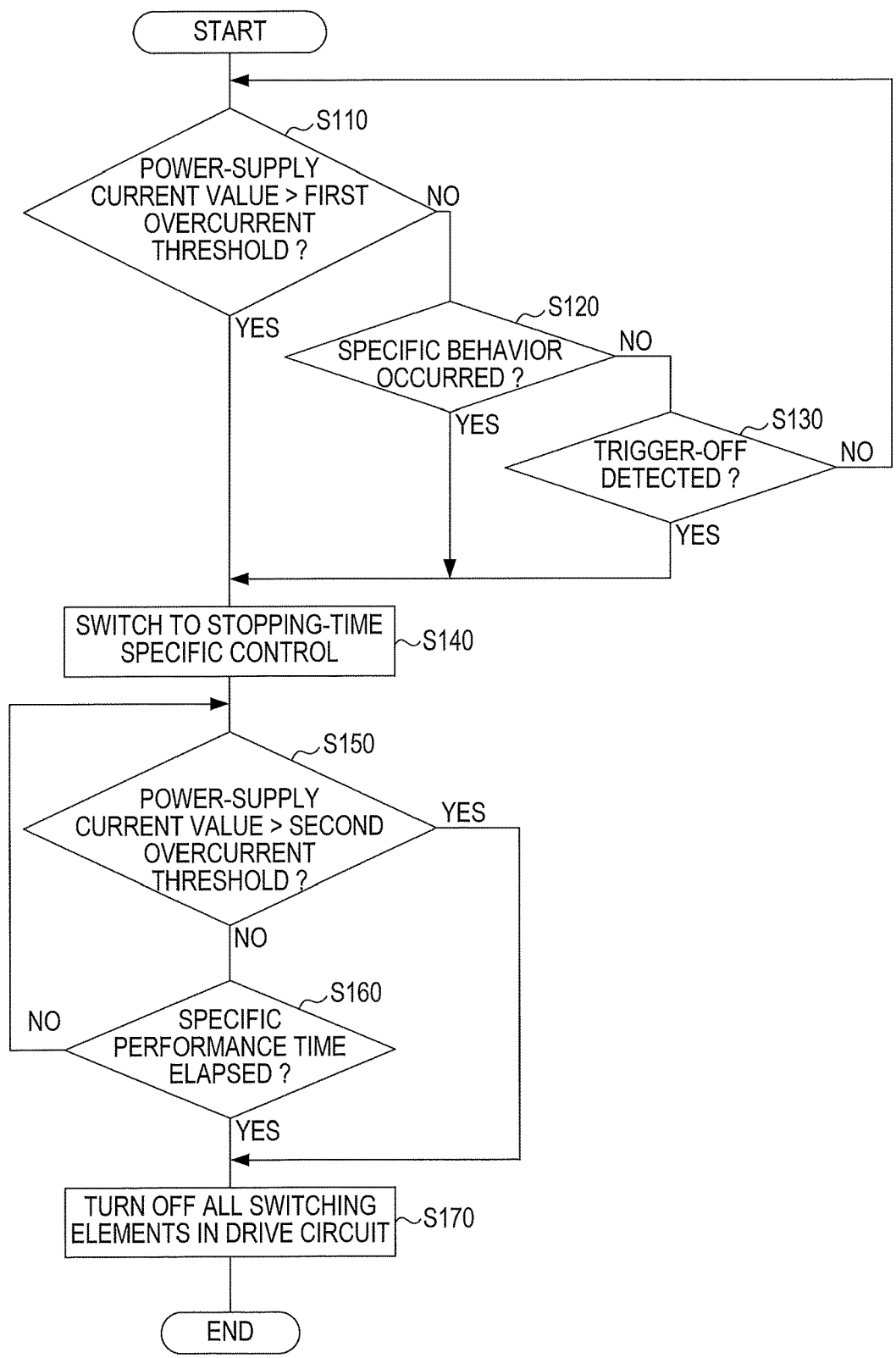
FIG. 7 is a flowchart showing an energization stop processing of the embodiments.

In response to starting the energization stop processing shown in FIG. 7, the controller 22 determines in S110 whether the value of the power-supply current is larger than the first overcurrent threshold. If the value of the power-supply current is larger than the first overcurrent threshold, that is, if the stop condition is satisfied, the controller 22 shifts the control of the motor 20 from the normal drive control to the stopping-time specific control in S140. Specifically, of the two currently ON-state switching elements, the switching element at the high side is turned OFF and the switching element at the low side is kept in the ON state.

If the value of the power-supply current is smaller than or equal to the first overcurrent threshold in S110, the processing proceeds to S120. In S120, the controller 22 determines whether the specific behavior has occurred. If the specific behavior has occurred, that is, if the stop condition is satisfied, the controller 22 shifts the control of the motor 20 from the normal drive control to the stopping-time specific control in S140. If the specific behavior has not occurred, the processing proceeds to S130.

In S130, the controller 22 determines whether the trigger switch 10 is in an OFF state. If the trigger switch 10 is in the OFF state, that is, if the stop condition is satisfied, the controller 22 shifts the control of the motor 20 from the normal drive control to the stopping-time specific control in S140. If the trigger switch 10 is in the ON state, the stop condition is not satisfied. Thus, the processing returns to S110, and the normal drive control is continued.

After shifting the control of the motor 20 from the normal drive control to the stopping-time specific control in S140, the controller 22 determines in S150 whether an interruption condition is satisfied. Specifically, the controller 22 determines whether the value of the power-supply current is larger than a second overcurrent threshold. In the stopping-time specific control, the ON-target switching element among the six switching elements Q1 to Q6 is one in number, and thus, the value of the power-supply current is to be zero. If the value of the power-supply current has nevertheless exceeded the second overcurrent threshold, any malfunction, such as a short-circuit failure, may have occurred in any of the switching elements, for example.

Thus, if the value of the power-supply current has exceeded the second overcurrent threshold in S150, the controller 22 brings all the switching elements Q1 to Q6 into the OFF state in S170, whereby terminating the energization stop processing. If the value of the power-supply current is smaller than or equal to the second overcurrent threshold in S150, the processing proceeds to S160. The first overcurrent threshold and the second overcurrent threshold may each be decided as appropriate. Further, the magnitude relationship between these two overcurrent thresholds may also be decided as appropriate, and they may be set to the same value.

In S160, the controller 22 determines whether the specific performance time has elapsed since the control of the motor 20 is shifted to the stopping-time specific control is S140. If the specific performance time has not elapsed, the processing returns to S150. If the specific performance time has elapsed, the processing proceeds to S170. In S170, the controller 22 brings all the switching elements Q1 to Q6 into the OFF state, to thereby terminate the energization stop processing.

(1-5) Effects of First Embodiment

The first embodiment described as above produces following effects. When the stop condition is satisfied during the normal drive control, the controller 22 performs the stopping-time specific control in which, of the two currently ON-state switching elements, the high-side switch is turned OFF and the low-side switch is kept in the ON state. Performance of such a stopping-time specific control stops the current flowing from the battery 15 to the motor 20, and causes the loop current to flow through the drive circuit 21 and the motor 20 by the magnetic energy accumulated in the motor 20.

This makes it possible, when the stop condition is satisfied, to stop the energization of the motor 20 while inhibiting generation of the regenerative current from the motor 20 to the battery 15.

The specific performance time for performing the stopping-time specific control is set to be equal to or longer than the time required until the loop current becomes zero. Thus, causing the loop current to flow makes it possible to consume all the magnetic energy accumulated in the motor 20 at the time of satisfaction of the stop condition. As a result, generation of the regenerative current flowing from the motor 20 to the battery 15 can be inhibited more effectively.

Set as the stop conditions are: that the trigger switch 10 is turned OFF (S130); that the value of the power-supply current exceeds the first overcurrent threshold (S110); and that the specific behavior occurs (S120). When at least one of these three stop conditions is satisfied during the normal drive control, the control of the motor 20 is shifted to the stopping-time specific control.

Thus, even in the case of occurrence of the improper drive state, such as increase in the value of the power-supply current beyond the first overcurrent threshold, it is possible to stop the current flowing from the battery 15 to the motor 20, while inhibiting generation of the regenerative current from the motor 20 to the battery 15. Also in the case where the trigger switch 10 is turned OFF by the user, it is possible to stop the rotation of the motor 20 while inhibiting generation of the regenerative current from the motor 20 to the battery 15.

In a case where the value of the power-supply current is still larger than the second overcurrent threshold even after shifting to the stopping-time specific control, all the switching elements Q1 to Q6 may be turned OFF.

The battery 15 corresponds to one example of a power source of the present disclosure. The diodes D1 to D6 correspond to one example of rectifier elements of the present disclosure. The trigger switch 10 corresponds to one example of an operation portion of the present disclosure. The acceleration sensor 26, the rotational position detector 23, and the current detector 24 correspond to one example of a drive state detector of the present disclosure.

[2. Second Embodiment]

The basic configuration of a second embodiment is similar to that of the first embodiment, and thus, differences therebetween will be described below. Reference numerals the same as those in the first embodiment indicate being the same elements, and thus, the preceding explanations thereof are to be referred to.

In the second embodiment, the switching element to be turned OFF and the switching element to be kept in the ON state in the stopping-time specific control are different from those in the first embodiment. Specifically, in the first embodiment, when the stop condition is satisfied to start the stopping-time specific control, of the two currently ON-state switching elements, the high-side switch is turned OFF and the low-side switch is kept in the ON state. In contrast to such first embodiment, in the second embodiment, of such two switching elements, the low-side switch is turned OFF and the high-side switch is kept in the ON state in the stopping-time specific control.

For example, a case will now be described in which the U-phase high-side switch Q1 and the W-phase low-side switch Q6 are in the ON state to thereby cause current to flow through a path indicated by a broken line with arrows in FIG. 8. When the stop condition is satisfied in this state and the control of the motor 20 is shifted to the stopping-time specific control, the U-phase high-side switch Q1 is kept in the ON state and the W-phase low-side switch Q6 is turned OFF.

Figure 8:
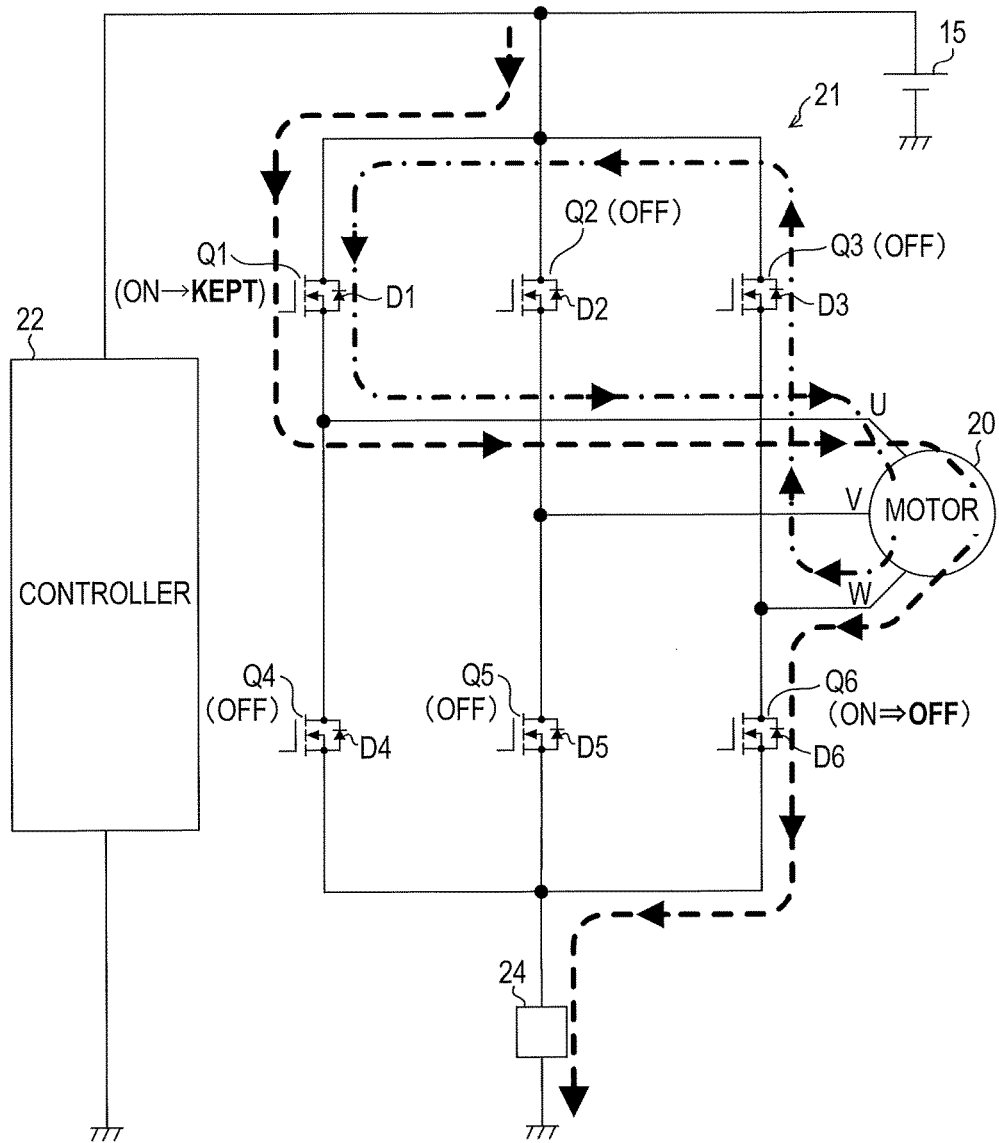
FIG. 8 is an explanatory diagram showing one example of respective current paths at the time of the normal drive control and at the time when the normal drive control has been shifted to a stopping-time specific control in the electric working machine of a second embodiment.

This causes a loop current to flow between the motor 20 and the drive circuit 21 through a path indicated by a dot-and-dash line with arrows in FIG. 8. Specifically, the loop current flows through the path leading from the third terminal 20c of the motor 20, via the diode D3 of the W-phase high-side switch Q3 and the U-phase high-side switch Q1, to the first terminal 20a of the motor 20. Thus, also in the second embodiment, effects similar to those of the first embodiment can be obtained. The loop current also flows through a path leading from the second terminal 20b of the motor 20, via the diode D2 of the V-phase high-side switch Q2 and the U-phase high-side switch Q1, to the first terminal 20a of the motor 20.

[3. Third Embodiment]

The basic configuration of a third embodiment is similar to that of the first embodiment, and thus, differences therebetween will be described below. Reference numerals the same as those in the first embodiment indicate being the same elements, and thus, the preceding explanations thereof are to be referred to.

In the above-described first embodiment, when the control of the motor 20 is shifted to the stopping-time specific control, of the two ON-state switching elements, the high-side switch is turned OFF. In the above-described second embodiment, when the control of the motor 20 is shifted to the stopping-time specific control, of the two ON-state switching elements, the low-side switch is turned OFF in contrast to the first embodiment.

In the third embodiment, when the control of the motor 20 is shifted to the stopping-time specific control, that is, when the stop condition is satisfied, the switching element that is being PWM-driven is turned OFF, and the switching element that is not being PWM-driven but fixed in the ON state is kept in the ON state as it is.

Figure 9:
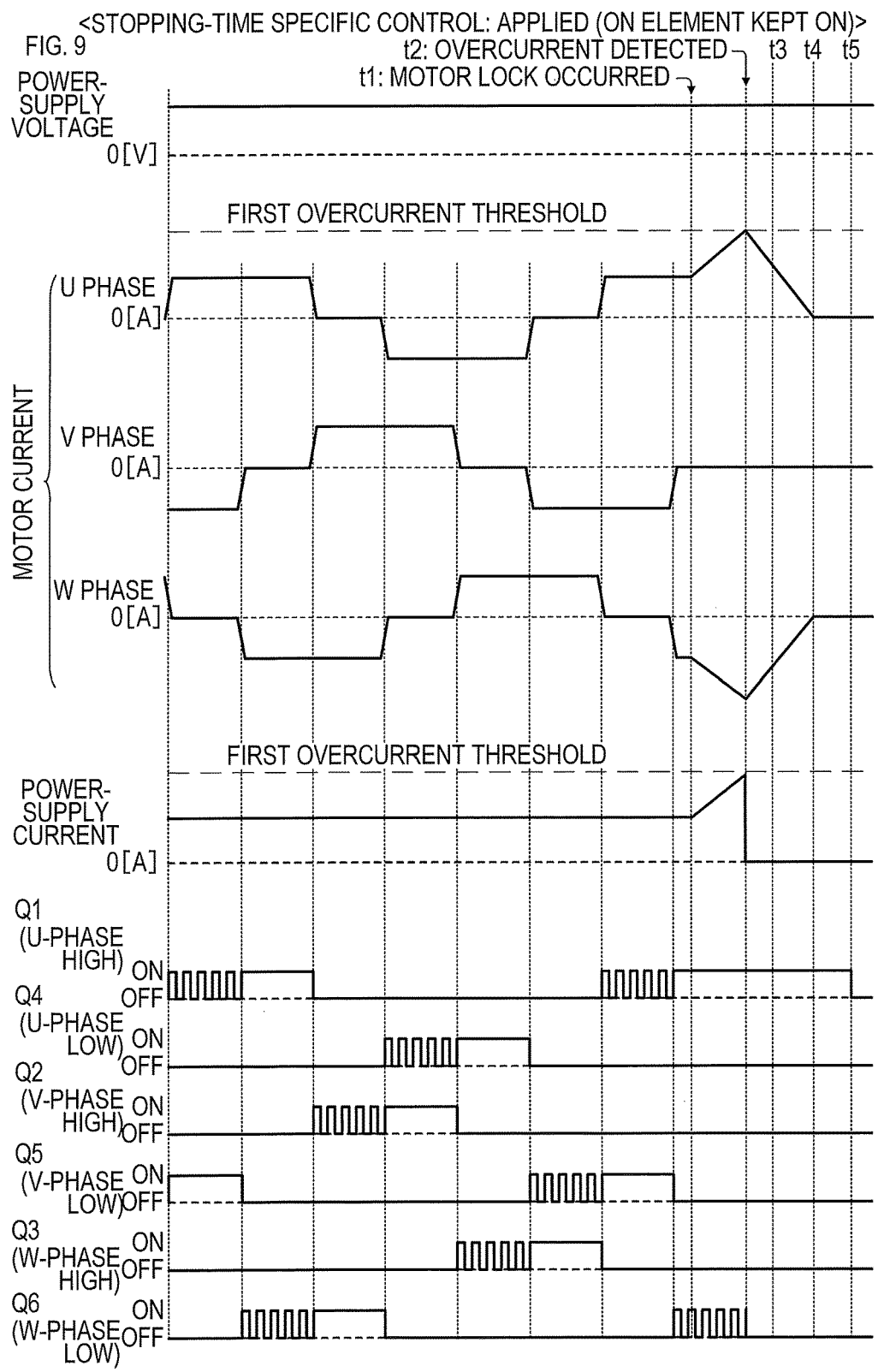
FIG. 9 is an explanatory diagram showing an operation example in a case of shifting to a stopping-time specific control during the normal drive control, in the electric working machine of a third embodiment.

For example, a case as illustrated in FIG. 9 will now be described in which, when the U-phase high-side switch Q1 and the W-phase low-side switch Q6 are in the ON state, the stop condition is satisfied at the time t2. More specifically, this case is such that, of the two ON-state switching elements Q1 and Q6, the U-phase high-side switch Q1 is fixed in the ON state and the W-phase low-side switch Q6 is being PWM-driven at the time t2.

In this case, when the control of the motor 20 is shifted to the stopping-time specific control at the time t2, the U-phase high-side switch Q1 fixed in the ON state is kept in the ON state as it is, and the W-phase low-side switch Q6 being PWM-driven is turned OFF. In FIG. 9, an operation example before the time t2 is completely the same as those in FIGS. 4 and 6.

Thus, also in the third embodiment, effects similar to those of the first embodiment can be obtained. Moreover, in the third embodiment, when the stop condition is satisfied, the PWM-driven switching element is turned OFF, and the switching element fixed in the ON state is kept in the ON state as it is. Accordingly, when the control of the motor 20 is shifted from the normal drive control to the stopping-time specific control in response to satisfaction of the stop condition, processing load on the controller 22 can be reduced.

[4. Fourth Embodiment]

The configuration illustrated in the first to third embodiments is such that the motor 20 is the brushless motor and the drive circuit 21 is an inverter including the six switching elements Q1 to Q6. On the other hand, illustrated in a fourth embodiment is a configuration in which the motor and the drive circuit are different from those of the first to third embodiments.

Figure 10:
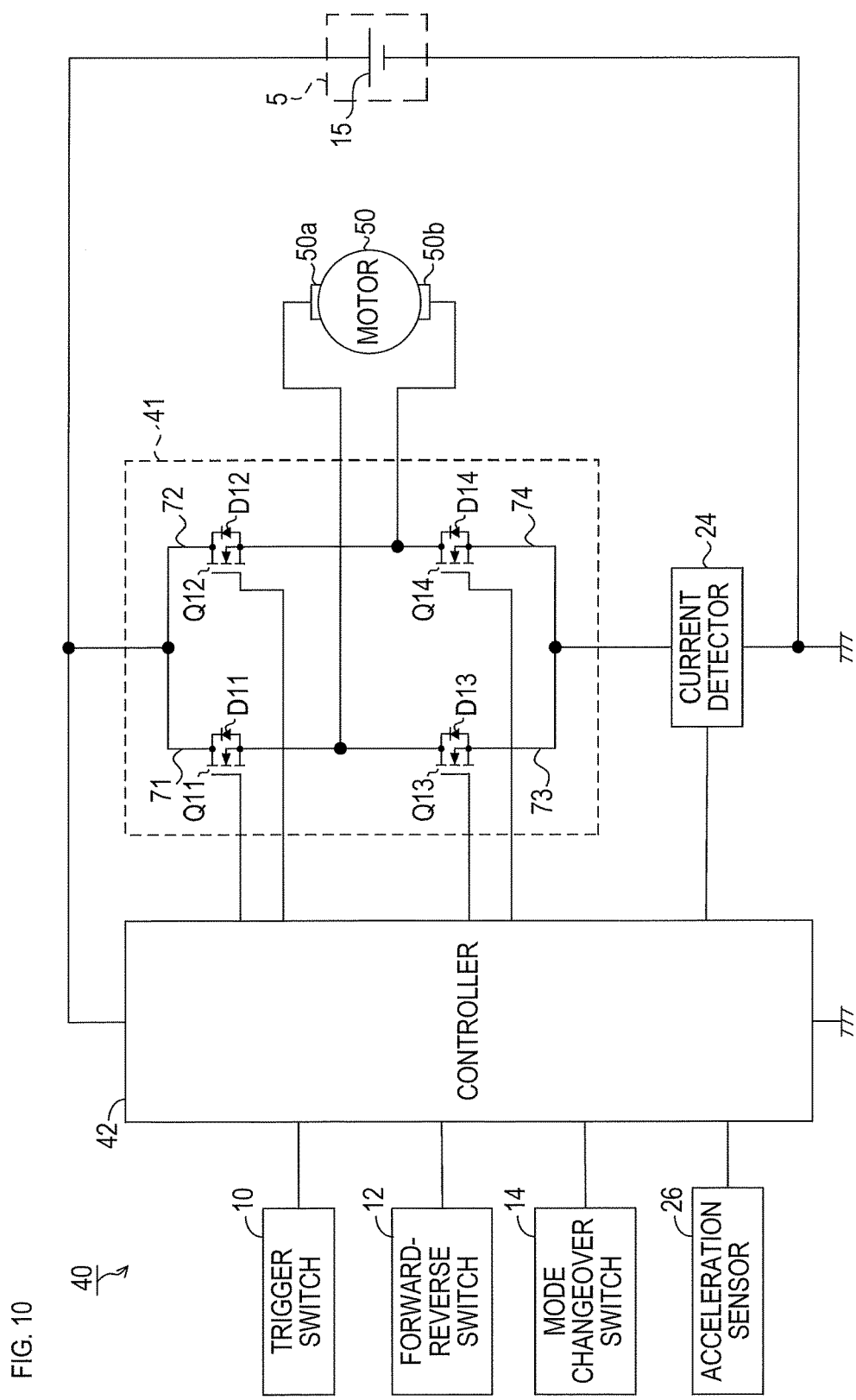
FIG. 10 is a configuration diagram showing an electrical configuration of the electric working machine of a fourth embodiment.

An electrical configuration of an electric working machine 40 of the fourth embodiment is shown in FIG. 10. The electrical configuration of the electric working machine 40 shown in FIG. 10 is different from the electric working machine 1 of the first embodiment shown in FIG. 2 mainly in the following three points. The first one is that a motor 50 is a brushed direct-current motor. The second one is that a drive circuit 41 is an H-bridge circuit. The third one is that the rotational position detector 23 is not necessary for operation of a brushed direct-current motor, and thus is optional.

The motor 50, which is the brushed direct-current motor, includes two terminals 50a and 50b to which the battery power is inputted. These terminals 50a and 50b are coupled to windings (not shown) within the motor 50.

The drive circuit 41 is the so-called H-bridge circuit including four switching elements Q11, Q12, Q13, and Q14. The two switching elements Q11 and Q12, which are high-side switches, are provided on two positive-side current paths 71 and 72, respectively. The two positive-side current paths 71 and 72 are current paths respectively coupling the terminals 50a and 50b of the motor 50 to the positive side of the battery 15. The two switching elements Q13 and Q14, which are low-side switches, are provided on two negative-side current paths 73 and 74, respectively. The two negative-side current paths 73 and 74 are current paths respectively coupling the terminals 50a and 50b of the motor 50 to the negative side of the battery 15.

In the present embodiment, the switching elements Q11 to Q14 are re-channel MOSFETs. Thus, diodes (so-called parasitic diodes) D11 to D14 are respectively connected between drains and sources of the switching elements Q11 to Q14 such that a forward direction of each of the diodes D11 to D14 is directed from the source side to the drain side. The diodes D11 to D14 are connected so as to permit current flow from the negative side to the positive side of the battery 15, and so as to prohibit current flow from the positive side to the negative side of the battery 15.

In the thus-configured electric working machine 40, a controller 42 performs the normal drive control in response to turning-ON of the trigger switch 10. Specifically, the controller 42 turns ON either one of the two switching elements Q11 and Q12 at the high side and either one of the two switching elements Q13 and Q14 at the low side. Also in the present embodiment, the control may be such that one of the ON-target two switching elements is fixed in the ON state and the other is PWM-driven.

Figure 11:
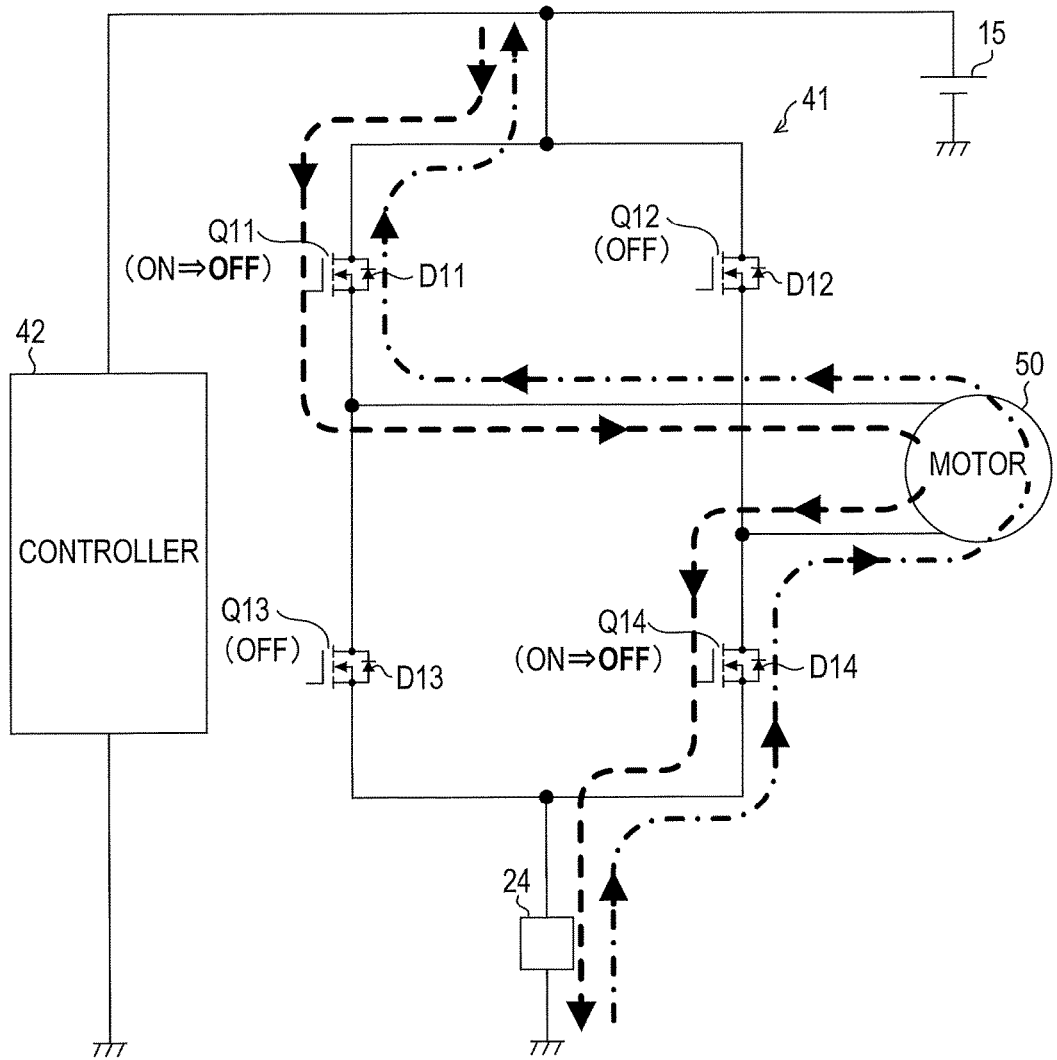
FIG. 11 is an explanatory diagram showing one example of respective current paths at the time of the normal drive control and at the time when all switching elements have been turned OFF during the normal drive control in the electric working machine of the fourth embodiment.
Figure 12:
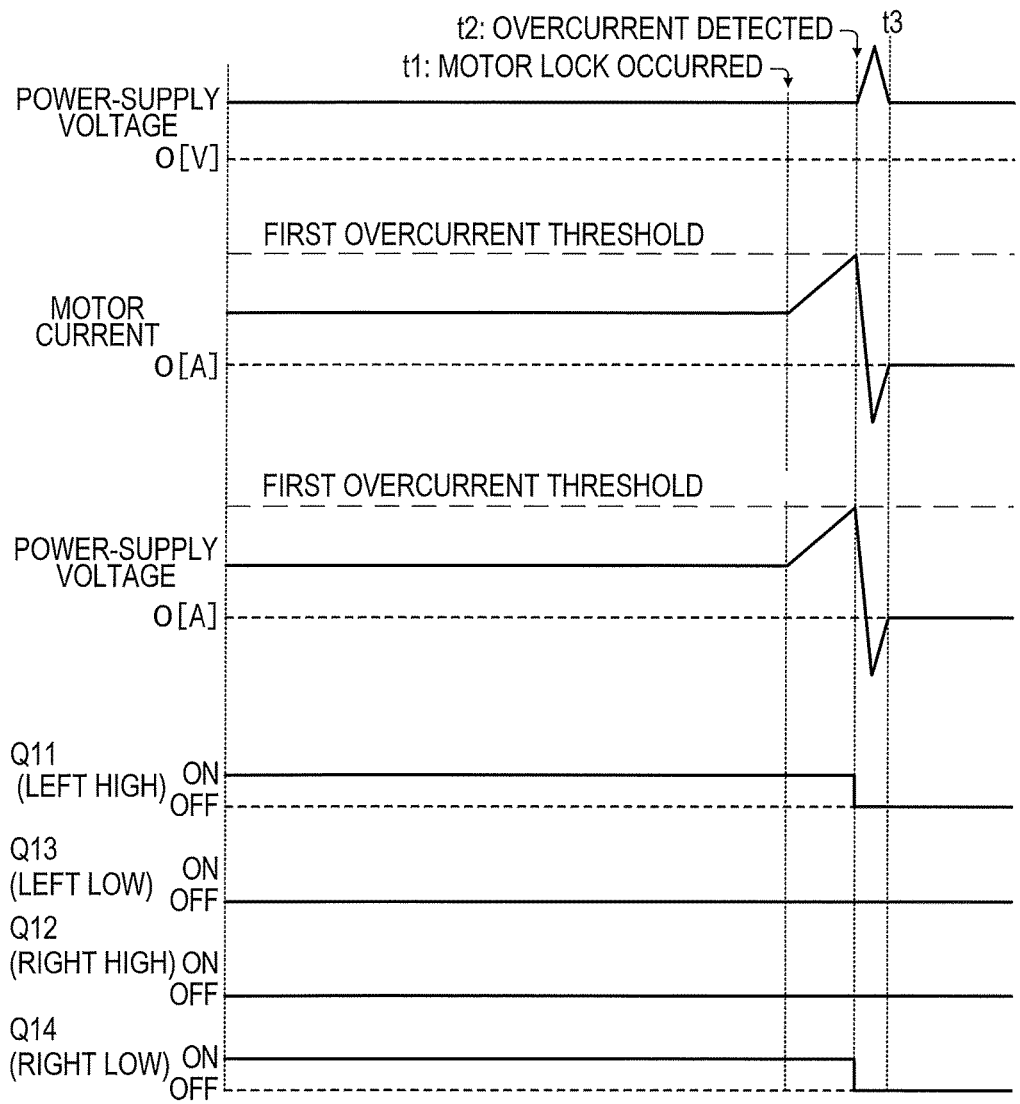
FIG. 12 is an explanatory diagram showing an operation example in a case of turning OFF all the switching elements during the normal drive control in the electric working machine of the fourth embodiment.

For example, a case will now be described in which, in the normal drive control, the switching element Q11 at the high side and the switching element Q14 at the low side are in the ON state as shown in FIGS. 11 and 12. In this case, current flows through a path leading from the battery 15 toward the motor 50 as indicated by a broken line with arrows in FIG. 11. Specifically, the current flows through the path leading from the positive electrode of the battery 15, via the switching element Q11 at the high side, the motor 50, the switching element Q14 at the low side, and the current detector 24, to the negative electrode of the battery 15. When the controller 42 changes the ON-target switching elements to the other two switching elements Q12 and Q13, a rotational direction of the motor 50 is switched.

In FIG. 12, a period before the time t2 is a period for performing the normal drive control, and the time t2 is a time point at which the control of the motor 50 is shifted from the normal drive control to the stopping-time specific control in response to satisfaction of the stop condition.

A case will now be described in which an improper drive state where the motor 50 is locked has occurred at the time t1 as shown in FIG. 12. In response to locking of the motor 50 at the time t1, the rotational speed of the motor 50 is decreased, or the motor 50 is stopped, and then, the values of the motor current and the power-supply current become larger than those in the normal drive state.

Then, when the value of the power-supply current has exceeded the first overcurrent threshold at the time t2, if the two ON-state switching elements Q11 and Q14 are both turned OFF, a regenerative current flowing to the battery 15 is generated by magnetic energy accumulated in the motor 50.

The regenerative current in this case is generated as shown by waveforms of the power-supply current and the motor current between the time t2 and the time t3 in FIG. 12, and flows through a path indicated by a dot-and-dash line with arrows in FIG. 11. As shown in FIG. 12, this regenerative current causes the power-supply voltage to rise temporarily.

Figure 13:
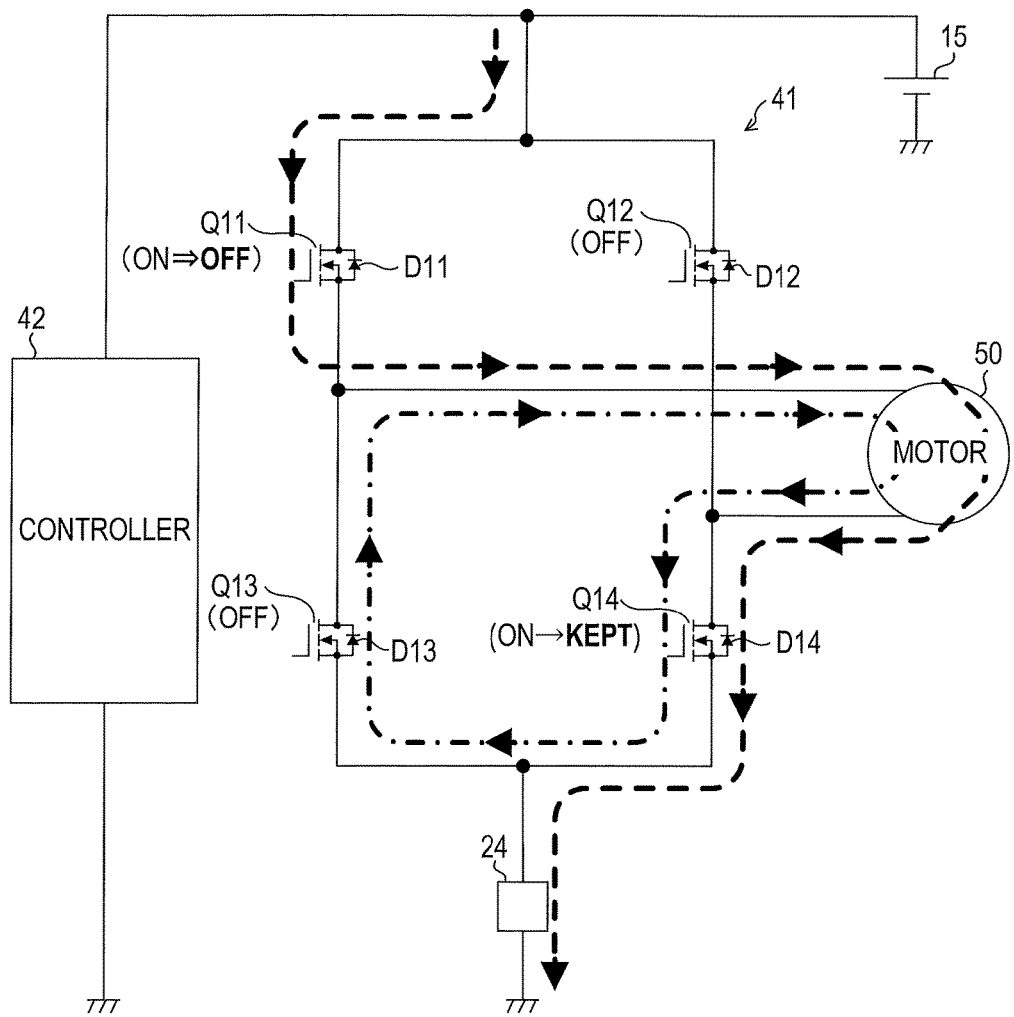
FIG. 13 is an explanatory diagram showing one example of respective current paths at the time of the normal drive control and at the time when the normal drive control has been shifted to a stopping-time specific control in the electric working machine of the fourth embodiment.

Thus, similarly to the controller 22 of the first to third embodiments, the controller 42 of the present embodiment also performs the stopping-time specific control for the specified period when the stop condition is satisfied during the normal drive control. A specific explanation will be given of one example of the stopping-time specific control of the present embodiment with reference to FIGS. 13 and 14. In the present embodiment, when the stop condition is satisfied during the normal drive control, the controller 42 performs the stopping-time specific control similar to that of the first embodiment. Specifically, of the two ON-state switching elements, the switching element at the high side is turned OFF, and the switching element at the low side is kept in the ON state. A current path during the normal drive control indicated by a broken line with arrows in FIG. 13 is the same as that in FIG. 11. An operation example before the time t2 in FIG. 14 is completely the same as that in FIG. 12.

As shown in FIG. 14, in response to occurrence of the locking of the motor 50 at the time t1, the value of the power-supply current is increased to exceed the first overcurrent threshold at the time t2, and then the stopping-time specific control is performed for the specified period. Similarly to the first embodiment, the specified period in the present embodiment is also a period from when the value of the power-supply current has exceeded the first overcurrent threshold to when the specific performance time has elapsed. That is, the specified period is a period from the time t2 to the time t5 in FIG. 14.

In the example shown in FIG. 14, the switching element Q11 at the high side and the switching element Q14 at the low side are in the ON state at the time t2 at which the value of the power-supply current exceeds the first overcurrent threshold. That is, at the time t2, the current is flowing through the path indicated by the broken line with arrows in FIG. 13. When the stopping-time specific control is performed in this state, the switching element Q11 at the high side is turned OFF and the switching element Q14 at the low side is kept in the ON state as shown in FIG. 14.

This causes a loop current to flow between the motor 50 and the drive circuit 41 through a path indicated by a dot-and-dash line with arrows in FIG. 13. Specifically, the loop current flows through the path leading from the second terminal 50b of the motor 50, via the switching element Q14 at the low side and the diode D13 of the switching element Q13 at the low side, to the first terminal 50a of the motor 50.

Thus, in response to start of the stopping-time specific control at the time t2, the power-supply current detected by the current detector 24 becomes zero as shown in FIG. 14, and the loop current flows between the motor 50 and the drive circuit 41. The loop current is gradually reduced to become zero at the time t4. Then, the stopping-time specific control is terminated at the time t5. In the present embodiment, in response to termination of the stopping-time specific control, the controller 42 brings all the switching elements Q11 to Q14 in the drive circuit 41 into the OFF state.

Also in the electric working machine 40 of the present embodiment, after start of the normal drive control, the controller 42 performs the energization stop processing shown in FIG. 7. Thus, also in the electric working machine 40 of the present embodiment, effects similar to those of the first embodiment can be obtained in the case where the stop condition is satisfied during the normal drive control.

[5. Other Embodiments]

While the embodiments of the present disclosure have been described so far, the present disclosure is not limited to the above-described embodiments and can be carried out in variously modified forms.

(5-1) As a method for setting the specific performance time for performing the stopping-time specific control, described in the first embodiment is such that the period required until the loop current becomes zero is determined theoretically or experimentally and the value obtained by adding the specified margin to the determined period is set as the specific performance time. However, such a method is just one example. The specific performance time for performing the stopping-time specific control may be set by various other methods.

It is not essential for the controller 22 and the controller 42 to perform the stopping-time specific control until the loop current becomes zero. The stopping-time specific control may be terminated while the loop current is still flowing. Also in such a case, the specific performance time for performing the stopping-time specific control may be decided as appropriate. For example, it may be one option to theoretically or experimentally determine a period in which the magnetic energy of the motor can be consumed to an extent that the rise in the power-supply voltage is suppressed below a specific level after generation of the regenerative current, and to set, as the specific performance time, a period from start of the stopping-time specific control to a specified time point at which the determined period or longer has elapsed.

It is not essential to set, as the specified period for performing the stopping-time specific control, the period from satisfaction of the stop condition to elapse of a given period such as the above-described specific performance time. For example, a period from satisfaction of the stop condition to satisfaction of a specific termination condition for terminating the stopping-time specific control may be set as the specified period.

Specifically, for example, it may be one option to actually detect the value of the loop current and to set, as the specified period for performing the stopping-time specific control, a period until the detected value becomes zero or a period until a specified further period has elapsed since the detected value becomes zero. In this case, where to specifically provide a detector to detect the value of the loop current on the loop current may be decided as appropriate.

For example, in a case where the stop condition other than turning-OFF of the trigger switch 10 is satisfied, a period from satisfaction of such a stop condition to turning-OFF of the trigger switch 10 may be set as the specified period for performing the stopping-time specific control.

For example, it may be one option to monitor the rotational speed of the motor 20 on the basis of the signal inputted from the rotational position detector 23 and to set, as the specified period for performing the stopping-time specific control, a period from satisfaction of the stop condition until the rotational speed of the motor 20 becomes lower, by a specified amount, than the rotational speed at the time of satisfaction of the stop condition. Alternatively, regardless of the rotational speed at the time of satisfaction of the stop condition, a period from satisfaction of the stop condition until the rotational speed of the motor 20 becomes equal to or lower than a specified rotational speed set in advance may be set as the specified period for performing the stopping-time specific control.

For example, it is not essential to set the time of satisfaction of the stop condition as the beginning of the stopping-time specific control (i.e., the beginning of the specified period). It may be one option to wait until satisfaction of a specified start condition after satisfaction of the stop condition and to start the stopping-time specific control in response to satisfaction of the start condition. That is, the point of time when the start condition is satisfied may be set as the beginning of the specified period. In this case, the start condition may be decided as appropriate. For example, elapse of a specified period after satisfaction of the stop condition may be set as the start condition.

In sum, the beginning, the termination, and the period of the specified period for performing the stopping-time specific control may all be set in various manners.

(5-2) It is just one example that the stop conditions for shifting the control of the motor from the normal drive control to the stopping-time specific control are: that the trigger switch 10 is turned OFF; that the value of the power-supply current exceeds the first overcurrent threshold; and that the specific behavior occurs. Only any one of these three conditions may be set as the stop condition, or any two of them may be set as the stop conditions. Alternatively, at least one or more conditions different from these three conditions may be set as the stop conditions.

For example, the stop condition may be that the rotational speed of the motor becomes equal to or lower than a threshold. One of the factors causing decrease in the rotational speed of the motor is considered to be locking of the motor. Thus, it may be one option to set the threshold for the rotational speed of the motor and, when the rotational speed of the motor has become equal to or lower than the threshold, to shift the control of the motor to the stopping-time specific control to thereby stop the motor while inhibiting generation of the regenerative current flowing to the battery 15 in the event of motor lock.

(5-3) It is just one example that the rectifier element connected in parallel to each switching element is the parasitic diode originally integrated in the switching element. A diode independent of the switching element may be connected thereto in parallel.

(5-4) It is just one example that the battery pack 5 is attachable to and detachable from the main body 3. For example, a configuration may be employed in which the battery 15 is integrated in the main body 3. Alternatively, the electric working machine may be configured, for example, to have an input portion (e.g., a DC jack) for input of external direct-current power and to be able to take in the direct-current power through the input portion to supply the power to the drive circuit.

The direct-current power source for driving the motor, that is, the power source of the power to be inputted to the drive circuit is not limited to the battery 15 and may be other power sources. For example, the electric working machine may be configured such that alternating-current power taken in from an external commercial power source or the like is converted into direct-current power by an AC/DC converter or the like and then the converted direct-current power is inputted to the drive circuit. In the case of the electric working machine of this example, the element converting the alternating-current power to the direct-current power, such as the AC/DC converter, corresponds to the direct-current power source of the present disclosure.

(5-5) As the electric working machine to which the present disclosure can be applied, the above-described driver drill is just one example. The present disclosure is applicable not only to the driver drill but also to various electric working machines, such as electric power tools for horticulture, stoneworking, metalworking, and wood working. More specifically, the present disclosure is applicable to various electric working machines with the motor, such as an electric hammer, an electric hammer drill, an electric drill, an electric driver, an electric wrench, an electric grinder, an electric reciprocating saw, an electric jigsaw, an electric cutter, an electric chainsaw, an electric circular saw, an electric plane, an electric nailer (including riveter), an electric hedge trimmer, an electric lawn mower, an electric lawn trimmer, an electric grass cutter, an electric cleaner, an electric blower, an electric sprayer, an electric spreader, and an electric dust collector.

(5-6) A plurality of functions performed by one element in the above-described embodiments may be performed by a plurality of elements, and one function performed by one element may be performed by a plurality of elements. A plurality of functions performed by a plurality of elements may be performed by one element, and one function performed by a plurality of elements may be performed by one element. Part of the configuration of the above-described embodiments may be omitted. At least part of the configuration of the above-described embodiments may be added to or replaced with the configuration of other embodiments described above. Any modes within the scope of the technical ideas identified from the claim language are embodiments of the present disclosure.

What is claimed is:

1. An electric working machine comprising:
   a motor including a first terminal, a second terminal, and a winding, the first terminal being electrically coupled to the second terminal via the winding;
   a first switching element provided on a first current path between a first electrode of a power source and the first terminal, the first switching element being configured to selectively complete or interrupt the first current path;
   a second switching element provided on a second current path between a second electrode of the power source and the second terminal, the second switching element being configured to selectively complete or interrupt the second current path;
   a rectifier element coupled in parallel to the winding and the first switching element coupled in series with each other, the rectifier element being configured to allow a loop current to circulate through the winding via the rectifier element and the first switching element in response to interruption of the second current path, the loop current flowing due to a magnetic energy accumulated in the winding;
   a controller configured to control the motor via the first switching element and the second switching element, the controller being configured to perform a drive control, in which: the first current path is completed via the first switching element; and the second current path is completed via the second switching element; the controller being further configured to perform a stop control, in which completion of the first current path is maintained via the first switching element for a specified period and the second current path is interrupted via the second switching element, in response to satisfaction of a stop condition for stopping power supply from the power source to the motor; and
   a current detector configured to detect a value of a current flowing to the motor,
   wherein the controller is further configured to interrupt the first current path via the first switching element during the stop control in response to detection, via the current detector, of the value larger than a short-circuit overcurrent threshold.

2. The electric working machine according to claim 1, wherein the specified period is equal to or longer than an estimated period from start of the stop control until a value of the loop current becomes zero.

3. The electric working machine according to claim 1, further comprising a third switching element provided on a third current path between the first electrode and the second terminal,
   wherein the rectifier element is coupled in parallel to the third switching element.

4. The electric working machine according to claim 1,
   wherein the motor includes a third terminal and an additional winding,
   wherein the third terminal is electrically coupled to the first terminal via the additional winding, and
   wherein the electric working machine further includes an additional rectifier element coupled in parallel to the additional winding and the first switching element coupled in series with each other, the additional rectifier element being configured to allow part of the loop current to circulate through the additional winding via the additional rectifier element and the first switching element in response to interruption of the second current path.

5. The electric working machine according to claim 1,
   wherein the controller is configured, in the drive control, to maintain completion of the first current path via the first switching element, and to switch between completion and interruption of the second current path via the second switching element according to a duty ratio.

6. The electric working machine according to claim 1, further comprising a drive state detector configured to detect a drive state of the motor,
   wherein the controller is further configured to determine whether the drive state of the motor is improper based on a detection result by the drive state detector, and
   wherein the stop condition is satisfied in response to determination by the controller that the drive state of the motor is improper.

7. The electric working machine according to claim 1, further comprising an operation portion configured to be operated to instruct rotation or stop of the motor,
   wherein the stop condition is satisfied in response to operation of the operation portion to stop rotation of the motor.

8. The electric working machine according to claim 1,
   wherein the first electrode corresponds to a positive electrode, and
   wherein the second electrode corresponds to a negative electrode.

9. The electric working machine according to claim 1,
   wherein the first electrode corresponds to a negative electrode, and
   wherein the second electrode corresponds to a positive electrode.

10. The electric working machine according to claim 1,
    wherein the power source is configured to generate a direct-current power.

11. The electric working machine of claim 1,
    wherein the stop conditions are satisfied in response to occurrence of at least one specific behavior associated with an acceleration sensor.

12. The electric working machine of claim 11,
    wherein the specific behavior includes a kickback.

13. The electric working machine of claim 7,
    wherein the operation portion is a trigger configured to be operated by a user to instruct rotation or stop of the motor.

14. An electric working machine comprising:
a motor including a first terminal, a second terminal, and a winding, the first terminal being electrically coupled to the second terminal via the winding;
a first switching element provided on a first current path between a first electrode of a power source and the first terminal, the first switching element being configured to selectively complete or interrupt the first current path;
a second switching element provided on a second current path between a second electrode of the power source and the second terminal, the second switching element being configured to selectively complete or interrupt the second current path;
a rectifier element coupled in parallel to the winding and the first switching element coupled in series with each other, the rectifier element being configured to allow a loop current to circulate through the winding via the rectifier element and the first switching element in response to interruption of the second current path, the loop current flowing due to a magnetic energy accumulated in the winding; and
a controller configured to control the motor via the first switching element and the second switching element, the controller being configured to perform a drive control, in which: the first current path is completed via the first switching element; and the second current path is completed via the second switching element; the controller being further configured to perform a stop control, in which completion of the first current path is maintained via the first switching element for a specified period and the second current path is interrupted via the second switching element, in response to occurrence of at least one specific behaviors associated with an acceleration sensor.

15. An electric working machine comprising:
a motor including a first terminal, a second terminal, and a winding, the first terminal being electrically coupled to the second terminal via the winding;
a trigger configured to be operated by a user to instruct rotation or stop of the motor;
a first switching element provided on a first current path between a first electrode of a power source and the first terminal, the first switching element being configured to selectively complete or interrupt the first current path;
a second switching element provided on a second current path between a second electrode of the power source and the second terminal, the second switching element being configured to selectively complete or interrupt the second current path;
a rectifier element coupled in parallel to the winding and the first switching element coupled in series with each other, the rectifier element being configured to allow a loop current to circulate through the winding via the rectifier element and the first switching element in response to interruption of the second current path, the loop current flowing due to a magnetic energy accumulated in the winding; and
a controller configured to control the motor via the first switching element and the second switching element, the controller being configured to perform a drive control, in which: the first current path is completed via the first switching element; and the second current path is completed via the second switching element; the controller being further configured to perform a stop control, in which completion of the first current path is maintained via the first switching element for a specified period and the second current path is interrupted via the second switching element, in response to operation of the trigger to stop rotation of the motor.

16. An electric working machine comprising:
a motor;
a controller; and
a drive circuit including:
   a first high-side switch;
   a second high-side switch;
   a first low-side switch; and
   a second low-side switch,
wherein the controller is configured to:
perform a stop control in which one of the switches of the drive circuit is kept ON and the remainder of the switches are turned OFF in response to satisfaction of at least one of the following stop conditions:
   a power-supply current is greater than a first overcurrent threshold;
   at least one specific behavior associated with an acceleration sensor has occurred; and
   a trigger is OFF; and
perform interruption processing in which all of the switches of the drive circuit are turned OFF during the stop control in response to satisfaction of at least one of the following interruption conditions:
   the power supply current is greater than a second overcurrent threshold associated with a short circuit; and
   a specific performance time has elapsed, such that a looping current inside of the drive circuit has stopped.

* * * * *